(12) United States Patent
Kwak et al.

(10) Patent No.: US 11,323,902 B2
(45) Date of Patent: May 3, 2022

(54) METHOD AND APPARATUS FOR INDICATING APERIODIC CSI REPORTING TIME IN WIRELESS COMMUNICATION SYSTEM

(71) Applicant: Samsung Electronics Co., Ltd., Suwon-si (KR)

(72) Inventors: Young-Woo Kwak, Suwon-si (KR); Hoon-Dong Noh, Suwon-si (KR); Cheol-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 16/100,869

(22) Filed: Aug. 10, 2018

(65) Prior Publication Data
US 2019/0053089 A1  Feb. 14, 2019

(30) Foreign Application Priority Data

Aug. 11, 2017 (KR) ........................ 10-2017-0102659

(51) Int. Cl.
*H04W 24/10* (2009.01)
*H04L 25/00* (2006.01)
(Continued)

(52) U.S. Cl.
CPC .......... *H04W 24/10* (2013.01); *H04B 7/0478* (2013.01); *H04B 7/063* (2013.01);
(Continued)

(58) Field of Classification Search
CPC .... H04B 7/0478; H04B 7/0626; H04B 7/063; H04B 7/0632; H04B 7/0647; H04L 25/00;
(Continued)

(56) References Cited

U.S. PATENT DOCUMENTS

2017/0041059 A1* 2/2017 Yi ........................ H04B 7/0456
2018/0175983 A1  1/2018 Yum et al.
(Continued)

FOREIGN PATENT DOCUMENTS

| KR | 10-2017-0020270 A | 2/2017 |
| WO | 2016-204546 A1 | 12/2016 |
| WO | 2017/078498 A1 | 5/2017 |

OTHER PUBLICATIONS

ZTE, On CSI framework details, R1-1707123, May 8, 2017, 3GPP TSG RAN WG1 Meeting #89, Hangzhou, China.
(Continued)

*Primary Examiner* — Asad M Nawaz
*Assistant Examiner* — Zhaohui Yang
(74) *Attorney, Agent, or Firm* — Jefferson IP Law, LLP

(57) ABSTRACT

A method and an apparatus for indicating the time of aperiodic channel status information (CSI) report in a wireless communication system are provided. The method for a user equipment (UE) configured to operate in a wireless communication system includes receiving configuration information about a resource of a reference signal from a base station, receiving, from the base station, feedback configuration information set based on the reference signal, receiving, via a downlink control information (DCI), a feedback transmission timing and an aperiodic CSI trigger transferred in the same slot as the reference signal, estimating an aperiodic channel status between the UE and the base station (BS) based on the reference signal, generating feedback information based on the estimated aperiodic channel status, and transmitting the feedback information to the base station based on the feedback transmission timing.

8 Claims, 14 Drawing Sheets

(51) Int. Cl.
| | |
|---|---|
| *H04B 7/06* | (2006.01) |
| *H04L 5/00* | (2006.01) |
| *H04B 7/0456* | (2017.01) |
| *H04W 68/00* | (2009.01) |
| *H04W 72/12* | (2009.01) |
| *H04W 24/00* | (2009.01) |
| *H04L 25/02* | (2006.01) |

(52) U.S. Cl.
 CPC ......... *H04B 7/0626* (2013.01); *H04B 7/0632* (2013.01); *H04B 7/0647* (2013.01); *H04L 5/005* (2013.01); *H04L 5/0057* (2013.01); *H04L 5/0094* (2013.01); *H04L 25/00* (2013.01); *H04W 68/005* (2013.01); *H04W 72/1273* (2013.01); *H04W 72/1289* (2013.01); *H04L 25/0224* (2013.01); *H04W 24/00* (2013.01)

(58) Field of Classification Search
 CPC ... H04L 25/0224; H04L 5/005; H04L 5/0057; H04L 5/0094; H04W 24/00; H04W 24/10; H04W 68/005; H04W 72/1273; H04W 72/1289
 See application file for complete search history.

(56) References Cited

U.S. PATENT DOCUMENTS

| | | | |
|---|---|---|---|
| 2018/0076924 A1* | 3/2018 | Lee | H04L 1/0026 |
| 2018/0102822 A1* | 4/2018 | Noh | H04L 5/0053 |
| 2018/0241523 A1 | 8/2018 | Noh et al. | |
| 2019/0342782 A1* | 11/2019 | Yum | H04L 5/0091 |

OTHER PUBLICATIONS

Huawei et al., Discussion on CSI Framework Design, R1-1706926, May 6, 2017, 3GPP TSG RAN WG1 Meeting #89, Hangzhou, China.
LG Electronics et al., WF on CSI timing, R1-1709396, May 17, 2017, 3GPP TSG RAN1 #89,Hangzhou, P.R. China.
Samsung, Discussions on CSI-RS design for NR MIMO, R1-1707970, May 4, 2017, 3GPP TSG RAN WG1Meeting #89, Hangzhou, China.
International Search Report dated Nov. 12, 2018, issued in International Patent Application No. PCT/KR2018/009226.
Korean Office Action dated Jun. 22, 2021, issued in a counterpart Korean Application No. 10-2017-0102659.
Qualcomm Incorporated; Details of CSI framework; 3GPP TSG RAN WG1 #88bis; R1-1705584; Mar. 25, 2017, Spokane, USA.

* cited by examiner

METHOD AND APPARATUS FOR INDICATING APERIODIC CSI REPORTING TIME IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0102659, filed on Aug. 11, 2017, in the Korean Intellectual Property Office, the disclosure of which is incorporated by reference herein in its entirety.

BACKGROUND

1. Field

The disclosure relates to wireless communication systems. More specifically, the disclosure relates to methods for reporting channel status information (CSI) between a user equipment (UE) and a base station (BS) in a wireless communication system.

2. Description of Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency-shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Mobile communication systems are evolving to high-speed, high-quality wireless packet data communication systems to provide data services and multimedia services beyond the initial versions that have provided voice-centered services. To that end, various standardization organizations, such as the 3rd generation partnership project (3GPP), the 3GPP2, and the institute of electrical and electronics engineers (IEEE), proceed with standardization of post-third generation mobile communication systems adopting multicarrier-based multiple access schemes. A diversity of mobile communication standards including the 3GPP LTE, the 3GPP2 ultra mobile broadband (UMB), and the IEEE 802.16m, have been developed to support high-rate, high-quality wireless packet data transmission services based on multiple access schemes.

LTE, UMB, 802.16m, and other existing 3G evolved mobile communication systems are based on multi-carrier multiple access schemes and feature adopting multiple antennas for MIMO and use of various techniques, such as adaptive modulation and coding (AMC) and channel sensitive scheduling to enhance transmission efficiency.

The above-enumerated techniques enhance system capability by, e.g., concentrating transmit power coming from several antennas depending on channel quality, adjusting the amount of data transmitted, or selectively transmitting data to the user with a good channel quality to bring up with better transmission efficiency.

Such schemes operate based on the channel status information (CSI) between the base station (BS) (evolved node B (eNB) or BS) and the terminal (user equipment (UE) or mobile station (MS)). Accordingly, the BS or the UE is required to measure the channel status.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for reporting channel status information (CSI) between a user equipment (UE) and a base station (BS) by the UE.

Another aspect of the disclosure is to provide methods and apparatuses for efficiently managing the channel status according to feedback timing indications, relevant reference signals, and CSI report settings.

Additional aspects will be set forth in part in the description which follows and, in part, will be apparent from the description, or may be learned by practice of the presented embodiments.

In accordance with an aspect of the disclosure, a method for a UE configured to operate in a wireless communication system is provided. The method includes receiving configuration information about a resource of a reference signal from a BS, receiving, from the base station, feedback configuration information set based on the reference signal, receiving, via downlink control information (DCI), a feedback transmission timing and an aperiodic CSI trigger transferred in the same slot as the reference signal, estimating an aperiodic channel status between the UE and the BS based on the reference signal, generating feedback information based on the estimated aperiodic channel status, and transmitting the feedback information to the BS based on the feedback transmission timing.

According to an embodiment, the feedback transmission timing may be determined by a time difference between the aperiodic CSI trigger and an aperiodic CSI report.

According to an embodiment, the feedback configuration information may include at least one of whether a precoding matrix indicator (PMI)/channel quality indicator (CQI) is reported, a period and offset of the PMI/CQI, a period and offset of a rank indicator (RI), a period and offset of a channel status information-reference signal (CSI-RS) resource indicator (CRI), whether a wideband or a subband, a submode, a type of CSI report, and a candidate number to indicate a timing between the aperiodic CSI trigger and an aperiodic CSI report.

According to an embodiment, where the aperiodic CSI trigger is received, the aperiodic CSI report may be generated based on a CSI report setting included in the configuration information about the resource of the reference signal.

According to an embodiment, the reference signal may be related to at least any one of a cell specific reference signal (CRS), a CSI-RS, and a channel status information-interference measurement (CSI-IM).

In accordance with another aspect of the disclosure, a method for a BS configured to operate in a wireless communication system is provided. The method includes transmitting configuration information about a resource of a reference signal to the UE, transmitting, to the UE, feedback configuration information set based on the reference signal, transmitting, to the UE via downlink control information (DCI, a feedback transmission timing and an aperiodic CSI trigger transferred in the same slot as the reference signal, and receiving feedback information, which is based on an aperiodic channel status between the UE and the base station, based on the feedback transmission timing.

According to an embodiment, the feedback transmission timing may be determined by a time difference between the aperiodic CSI trigger and an aperiodic CSI report.

According to an embodiment, the feedback configuration information may include at least one of whether a PMI/CQI is reported, a period and offset of the PMI/CQI, a period and offset of a RI, a period and offset of a CRI, whether a wideband or a subband, a submode, a type of CSI report, and a candidate number to indicate a timing between the aperiodic CSI trigger and an aperiodic CSI report.

According to an embodiment, where the aperiodic CSI trigger is received, the aperiodic CSI report may be generated based on a CSI report setting included in the configuration information about the resource of the reference signal.

According to an embodiment, the reference signal may be related to at least any one of a CRS, a CSI-RS, and a CSI-IM.

In accordance with another aspect of the disclosure, a UE configured to operate in a wireless communication system is provided. The UE includes a communication circuit configured to transmit or receive signals with a transmitting UE or a BS and at least one processor configured to control the communication unit. The at least one processor may be configured to receive configuration information about a resource of a reference signal from a base station, receive, from the BS, feedback configuration information set based on the reference signal, receive, via downlink control information (DCI, a feedback transmission timing and an aperiodic CSI trigger transferred in the same slot as the reference signal, estimate an aperiodic channel status between the UE and the BS based on the reference signal, generate feedback information based on the estimated aperiodic channel status, and transmit the feedback information to the BS based on the feedback transmission timing.

According to an embodiment, the feedback transmission timing may be determined by a time difference between the aperiodic CSI trigger and an aperiodic CSI report.

According to an embodiment, the feedback configuration information may include at least one of whether a PMI/CQI is reported, a period and offset of the PMI/CQI, a period and offset of a RI, a period and offset of a CRI, whether a wideband or a subband, a submode, a type of CSI report, and a candidate number to indicate a timing between the aperiodic CSI trigger and an aperiodic CSI report.

According to an embodiment, where the aperiodic CSI trigger is received, the aperiodic CSI report may be generated based on a CSI report setting included in the configuration information about the resource of the reference signal.

According to an embodiment, the reference signal may be related to at least any one of a CRS, a CSI-RS, and a CSI-IM.

In accordance with another aspect of the disclosure, a BS configured to operate in a wireless communication system is provided. The BS includes a communication circuit configured to transmit or receive signals with another BS or a UE and at least one processor configured to control the communication circuit. The at least one processor may be configured to transmit configuration information about a resource of a reference signal to the UE, transmit, to the UE, feedback configuration information set based on the reference signal, transmit, to the UE via downlink control information (DCI, a feedback transmission timing and an aperiodic CSI trigger transferred in the same slot as the reference signal, and receive feedback information, which is based on an aperiodic channel status between the UE and the BS, based on the feedback transmission timing.

According to an embodiment, the feedback transmission timing may be determined by a time difference between the aperiodic CSI trigger and an aperiodic CSI report.

According to an embodiment, the feedback configuration information may include at least one of whether a PMI/CQI is reported, a period and offset of the PMI/CQI, a period and offset of a RI, a period and offset of CRI, whether a wideband or a subband, a submode, a type of CSI report, and a candidate number to indicate a timing between the aperiodic CSI trigger and an aperiodic CSI report.

According to an embodiment, where the aperiodic CSI trigger is received, the aperiodic CSI report may be generated based on a CSI report setting included in the configuration information about the resource of the reference signal.

According to an embodiment, the reference signal may be related to at least any one of a CRS, a CSI-RS, and a CSI-IM.

Embodiments of the disclosure may efficiently manage the channel status according to feedback timing indications, relevant reference signals, and CSI report settings.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
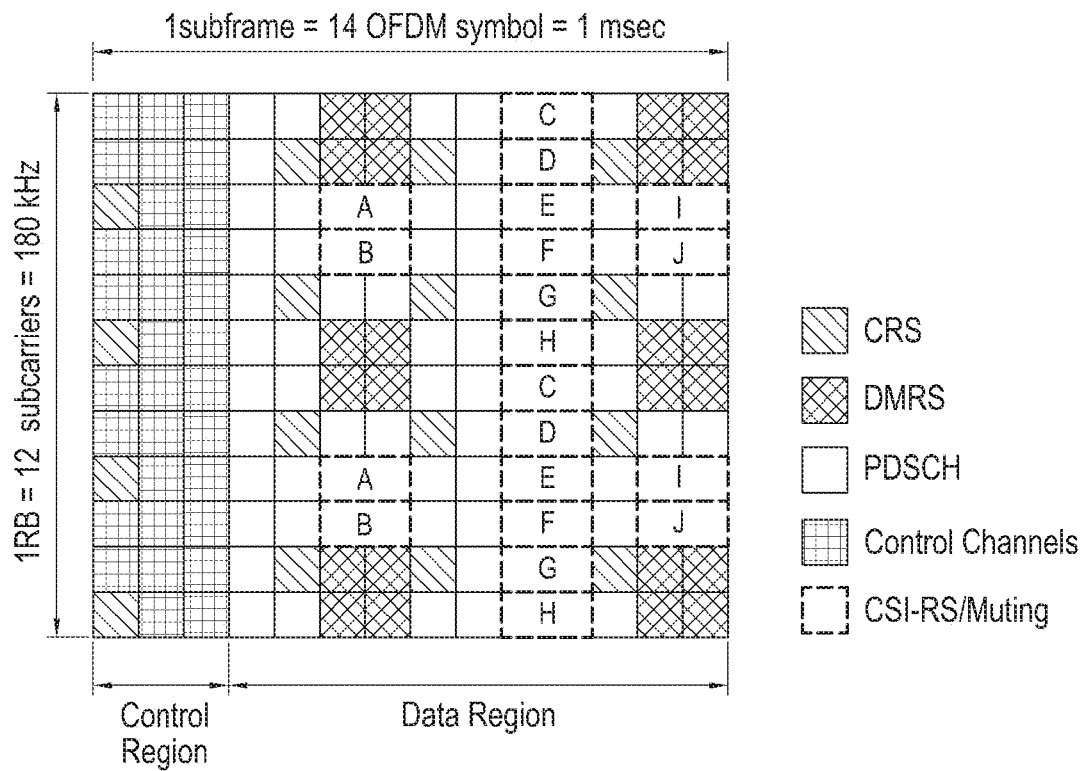
FIG. 1 is a view illustrating a radio resource configuration of an long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In new radio (NR), a brand-new 5th generation (5G) communication scheme, the base station (BS) may indicate, to the user equipment (UE), the time difference between the aperiodic channel status information (CSI) trigger (aperiodic CSI trigger) and the aperiodic channel status report (aperiodic CSI report) via the downlink control information (DCI), which is different from the one previously defined. At this time, one possible time difference is self-contained CSI reporting by which an aperiodic channel status information-reference signal (CSI-RS) is immediately measured in a triggered slot and immediately reported in the slot. Such CSI report is rendered possible as the BS indicates to the UE that the aperiodic CSI reporting should be made in the slot immediately with the trigger and aperiodic CSI-RS transmission. At this time, there may be a setting that might not be supported by the UE depending on the number of CSI-RS ports, CSI-RS positions, and other report parameters. According to an embodiment, there is proposed a method for efficiently reporting the channel status depending on the timing indication, the relevant reference signal, and the CSI report setting. The CSI-RS is used to measure the channel status between the base station (BS) (evolved node B (eNB) or BS and the UE (mobile station (MS)).

The disclosure relates to a wireless communication system, and particularly, to a method for mapping a reference signal (RS) in a wireless communication system adopting a multiple access scheme using multiple carriers such as orthogonal frequency division multiple access (OFDMA).

The BS means a downlink transmission and uplink reception device positioned in a predetermined place, and one BS performs communication on multiple cells. A plurality of base stations are geographically dispersed in one mobile communication system, and each BS performs communication on the plurality of cells.

The long term evolution (LTE)/LTE-advanced (LTE-A) or other 3rd or 4th generation mobile communication systems utilize multiple input multiple output (MIMO) technology that transmits signals using a plurality of transmit (TX)/receive (RX) antennas in order to increase system capability and data transmission rate. The MIMO technology makes use of a plurality of TX/RX antennas to spatially separate and transmit a plurality of information streams. As such, spatially separating and transmitting a plurality of information streams is called spatial multiplexing.

The number of information streams that may be created by applying spatial multiplexing is varied depending on the number of the antennas of the transmitter and the receiver. How many information streams may be created by applying spatial multiplexing is called the rank of the transmission. The MIMO technology supported by LTE/LTE-A release 11 and its prior releases supports spatial multiplexing for up to 16 transmit (TX) antennas and up to eight receive (RX) antennas, and where there are 16 TX antennas and 8 RX antennas, ranks up to 8 are supported.

NR access technology, which is a 5G mobile communication system currently under discussion, aims to support various services, such as enhanced mobile broadband (eMBB), massive machine type communication (mMTC), and ultra-reliable low latency communications (URLLC). This design goal may be achieved by allowing time and frequency resources to be flexibly transmitted by transmitting reference signals aperiodically while minimizing the reference signal that is transmitted all the time.

Although the features described below focus on NR, LTE, and LTE-A systems, this is merely an example, and the disclosure may also be applicable to other communication systems that take advantage of licensed and unlicensed bands.

FIG. 1 is a view illustrating a radio resource of one subframe and one resource block (RB) that is the minimum unit for scheduling on downlink in the LTE/LTE-A system according to an embodiment of the disclosure.

Referring to FIG. 1, the radio resource consists of one subframe on the time axis and one RB on the frequency axis. The radio resource includes 12 subcarriers in the frequency domain and 14 OFDM symbols in the time domain, totaling 168 (12*14) unique frequencies and time positions. In the LTE/LTE-A system, each unique frequency and time position shown in FIG. 1 is called a resource element (RE).

A plurality of different types of signals as follow may be transmitted through the radio resource shown in FIG. 1.

1. Cell specific RS (CRS): a reference signal that is periodically transmitted for all the UEs belonging to one cell and that may be shared by a plurality of UEs.

2. Demodulation reference signal (DMRS): a reference signal transmitted for a particular UE. This signal is transmitted only when data is transmitted to the corresponding UE. A DMRS may consist of a total of eight DMRS ports. In LTE/LTE-A, port 7 to port 14 correspond to DMRS ports, and the ports remain orthogonal not to interfere with each other using code division multiplexing (CDM) or frequency division multiplexing (FDM).

3. Physical downlink shared channel (PDSCH): a data channel transmitted on the downlink, used for a BS to transmit traffic to a UE, and transmitted via an RE where no reference signal is transmitted in the data region of the radio resource shown in FIG. 1.

4. CSI-RS: a reference signal transmitted for UEs belonging to one cell. This reference signal is used to measure the channel status. A plurality of CSI-RSs may be transmitted in one cell.

5. Other control channels (physical hybrid automatic repeat request indicator channel (PHICH), physical control format indicator channel (PCFICH), physical downlink control channel (PDCCH)): these channels are used to transmit acknowledgment (ACKs)/negative acknowledgment (NACKs) to operate the hybrid automatic repeat request (HARQ) for uplink data transmission or to provide control information necessary for the UE to receive the physical HARQ indicator channel (PDSCH).

Besides the signals, the LTE-A system may set a muting so that CSI-RS transmitted from another BS may be received without interfering with the UEs in the cell. The muting may apply at the position where a CSI-RS may be transmitted. Generally, the UE skips the corresponding radio resource and receives a traffic signal. The muting in the LTE-A system is also called zero-power CSI-RS. By the nature of muting, muting applies likewise at the position of the CSI-RS because no transmit power is transmitted.

Referring to FIG. 1, the CSI-RS may be transmitted using some of the positions denoted with A, B, C, D, E, E, F, G, H, I, and J depending on the number of antennas transmitting the CSI-RS. Further, the muting may also apply to some of the positions denoted with A, B, C, D, E, E, F, G, H, I, and J. In particular, the CSI-RS may be transmitted via two, four, or eight REs depending on the number of transmit (TX) antenna ports. In case the number of antenna ports is two, the CSI-RS is transmitted through a half of a particular pattern of FIG. 1, in case the number of antenna ports is four, the CSI-RS is transmitted through the overall particular pattern, and in case the number of antenna ports is eight, the CSI-RS is transmitted via two patterns. By contrast, the muting is carried out always through each pattern. That is, the muting, although applicable to a plurality of patterns, cannot apply to part of one pattern in case it does not overlap the position of the CSI-RS. However, only if the muting overlaps at position the CSI-RS, it may apply only to part of one pattern. In case CSI-RSs are transmitted for two antenna ports, the CSI-RSs transmit respective antenna port signals through two REs connected on the time axis and the signals of the antenna ports are differentiated by orthogonal codes. Further, in case CSI-RSs are transmitted for four antenna ports, two REs are added to the CSI-RSs for two antenna ports, so that signals for the two antenna ports are further transmitted by the same method. It is true for the case where CSI-RSs for eight antenna ports are transmitted. The CSI-RS supporting 12 and 16 antenna ports is formed by combining three CSI-RS transmission positions for four existing antenna ports or combining two CSI-RS transmission positions for eight antenna ports.

The CSI-interference measurement (CSI-IM) (or CSI-IM resources (IMR), along with the CSI-RS, may be assigned to the UE. The resource of the CSI-IM has the same resource architecture and position as the CSI-RS supporting four ports. The CSI-IM is a resource for the UE receiving data from one or more base stations to exactly measure interference from a neighbor base station. In the case of measuring the amount of interference when a neighbor BS transmits data and the amount of interference when it does not, the BS may configure the CSI-RS and two CSI-IM resources so that one CSI-IM enables the neighbor BS to always transmit signals while the other CSI-IM prevents the neighbor BS from always transmitting signals, thereby allowing the amount of interference from the neighbor BS to be effectively measured.

The radio resource control (RRC) field constituting the CSI-RS configuration.

Four configurations may be provided to report the channel status based on the periodic CSI-RS in the CSI process.

1) CSI-RS configuration may include information on a number of antenna ports, resource configuration, time and frequency position in a subframe, subframe configuration, periodicity and subframe offset, Qcl-CRS-information (QCL Type B), and CRS information for CoMP.

2) CSI-IM configuration may include information on resource configuration, time and frequency position in a subframe, subframe configuration, and periodicity and subframe offset.

3) CQI report configuration may include information on periodic mode, resource, periodicity, offset, aperiodic mode, PMI/RI report, RI reference CSI process, subframe pattern.

4) Other configurations (Etc) may include information on Pc and codebook subset restriction.

CSI-RS config is intended for setting the frequency and time position of the CSI-RS RE. Here, how many ports the CSI-RS has is set by the antenna count configuration. Resource config sets the RE position in the RB, and Subframe config sets the period and offset of the subframe. Table 1 is intended for Resource config and Subframe config currently supported by LTE.

TABLE 2

Resource config and Subframe config settings (a) Resource config setting

| CSI reference signal configuration | Number of CSI reference signals configured | | | | | |
|---|---|---|---|---|---|---|
| | 1 or 2 | | 4 | | 8 | |
| | (k′, l′) | $n_s$ mod 2 | (k′, l′) | $n_s$ mod 2 | (k′, l′) | $n_s$ mod 2 |

| | | | | | | | |
|---|---|---|---|---|---|---|---|
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

(b) Subframe config setting

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 1, the UE may identify the frequency and time positions of the RE via Resource config and the period and offset of the subframe via Subframe config.

Qcl-CRS-info sets quasi co-location information for coordinated multi-point (CoMP).

CSI-IM config is intended for setting the frequency and time positions of the CSI-IM for the UE, which receives data from one or more base stations, to measure interference from a neighbor base station. Since the CSI-IM is always set based on four ports, there is no need for setting the number of antenna ports. Resource config and Subframe config are set in the same manner as the CSI-RS.

Channel quality indicator (CQI) report config exists to set how to report the channel status using the CSI process. CQI stands for channel quality indicator. As shown in Tables 2 to 4 below, CQI report config may include, in the corresponding settings, a periodic channel status report setting, an aperiodic channel status report setting, a precoding matrix indicator (PMI)/rank indicator (RI) report setting, an RI reference CSI process setting, and a SubframePattern setting.

SubframePattern sets a measurement subframe subset for supporting the channel and interference measurement having a temporally different property in measuring the channel and interference that the UE receives. Measurement subframe subset has been introduced for estimation by reflecting different interference properties between the almost blank subframe (ABS) and the non-ABS subframe in the enhanced inter-cell interference coordination (eICIC). Measurement subframe subset has evolved to be capable of measurement by setting two IMRs to measure different channel properties between the subframe that always operates on DL and the subframe that dynamically switch between DL and UL in the enhanced interference mitigation and traffic adaption (eIMTA).

Tables 2 and 3 represent the measurement subframe subset for supporting the eICIC and the eIMTA.

TABLE 3

Measurement subframe subset setting for eICIC

```
CQI-ReportConfig-r10 ::= SEQUENCE {
    cqi-ReportAperiodic-r10         CQI-RepertAperiodic-r10  OPTIONAL --Need ON
    nomPDSCH-RS-EPRE-Offset         INTEGER (-1..6),
    cqi-ReportPeriodic-r10          CQI-ReportPeriodic-r10   OPTIONAL --Need ON
    pmi-RI-Report-r9                ENUMERATED (setup)       OPTIONAL, --Cond
PMIRIPCell
    csi-SubframePatternConfig-r10   CHOICE {
        release                     NULL,
        setup                       SEQUENCE {
            csi-MeasSubframeSet1-r10    MeasSubframePattern-r10
            csi-MeasSubframeSet2-r10    MeasSubframePattern-r10
        }
    }                                                         OPTIONAL, --Need ON
}
```

TABLE 4

Measurement subframe subset setting for eIMTA

```
CQI-ReportConfig-v1250 ::=      SEQUENCE {
    csi-SubframePatternConfig-r12   CHOICE {
        release                     NULL,
        setup                       SEQUENCE {
            csi-MeasSubframeSets-r12    BIT STRING (SIZE (10))
        }
    }                                                       OPTIONAL, --Need ON
    cqi-ReportBoth-v1250        CQI-ReportBoth-v1250        OPTIONAL, --Need ON
    cqi-ReportAperiodic-v1250   CQI-ReportAperiodic-v1250   OPTIONAL, --Need ON
    altCQI-Table-r12    ENUMERATED {
                                allSubframes, csi-SubframeSet1,
                                csi-SubframeSet2, spare1}   OPTIONAL, --Need OP
}
```

The measurement subframe subset for the eICIC supported in LTE is set using csi-MeasSubframeSet1-r10 and csi-MeasSubframeSet2-r10, and MeasSubframePattern-r10 referenced by the corresponding fields of csi-MeasSubframeSet1-r10 and csi-MeasSubframeSet2-r10 is as shown in Table 4 below.

TABLE 5

MeasSubframePattern

```
--ASN1START
MeasSubframePattern-r10 ::= CHOICE {
    subframePatternFDD-r10      BIT STRAING (SIZE (40)),
    subframePatternTDD-r10      CHOICE {
        subframeConfig1-5-r10       BIT STRAING (SIZE (20)),
        subframeConfig0-r10         BIT STRAING (SIZE (70)),
        subframeConfig6-r10         BIT STRAING (SIZE (60)),
        ...
    }
    ...
}
--ASN1STOP
```

The above fields, subframePatternFDD-r10, subframePatternTDD-r10, subframeConfig1-5-r10, subframeConfig0-r10, or subframeConfig6-r10 have bit string values. The bit string means the left MSB (subframe #0) through subframe #N−1 of size(N), and the bit value being 1 indicates that it is contained in the corresponding measurement subframe subset.

eICIC measurement subframe subset sets each subframe set via each field, but eIMTA measurement subframe subset indicates 0 with the first subframe set and 1 with the subframe set using one field. Accordingly, in the case of eICIC subframe set, the corresponding subframe may not be included in two subframe sets, but in the case of eIMTA subframe set, it should always be included in one of the two subframe sets.

The others may include the PDSCH necessary for the UE to generate the channel status report, the power ratio (PC), and the codebook subset restriction to set what codebook is used. Referring to Tables 5 and 6, in the PC and the codebook subset restriction, each field means the setting for each subframe subset by the p-C-AndCBSRList field including two P-C-AndCBSR fields of Table 6 in the list format.

TABLE 6 p-C-AndCBSRList

```
CSI-Process-r11 ::=             SEQUENCE {
    ...
    p-C-AndCBSRList-r11         SEQUENCE (SIZE (1..2)) OF
                                P-C-AndCBSR-r11,
    ...
}
```

TABLE 7

P-C-AndCBSR

```
P-C-AndCBSR-r11         SEQUENCE {
    p-C-r11                 INTEGER (-8..15),
    codebookSubsetRestriction-r11   BIT STRAING
}
```

$P_C$ may be defined as shown in Equation 1 and may be designated with a value ranging from −8 dB to 15 dB.

$$P_C = \frac{PDSCH\ EPRE}{CSI\text{-}RS\ EPRE} \qquad \text{Equation 1}$$

Here, energy per resource element (EPRE) means energy per RE.

The BS may variably adjust CSI-RS transmit power for enhancing channel estimation accuracy, and the UE may be aware how low or high the transmit power to be used for data transmission is relative to the transmit power used for channel estimation through the $P_C$ notified. The UE may calculate and report exact CQI to the BS even when the BS varies the CSI-RS transmit power.

In the cellular system, a BS should transmit a reference signal to a UE in order to measure the downlink channel status. In 3rd generation partnership project (3GPP) LTE-A systems, a UE measures the channel status between a BS and the UE using the CRS or CSI-RS that the BS sends to the UE.

For the channel status, the amount of interference on the download should be considered. The amount of interference on the download means the amount of interference by the antenna of the neighbor base station, and EPRE means energy per RE.

The BS may variably adjust CSI-RS transmit power for enhancing channel estimation accuracy, and the UE may be aware how low or high the transmit power to be used for data transmission is relative to the transmit power used for channel estimation through the $P_C$ notified. The UE may calculate and report exact CQI to the BS even when the BS varies the CSI-RS transmit power.

In the cellular system, a BS should transmit a reference signal to a UE in order to measure the downlink channel status. In 3GPP LTE-A systems, the UE measures the channel status between the BS and the UE using the CRS or CSI-RS that the BS transmits to the UE.

For the channel status, the amount of interference on the downlink should be considered. The amount of interference on the downlink includes interference signals and thermal noise that are created by the antennas of neighbor base stations and is critical for the UE to determine the channel status of the downlink. As an example, where a BS with one transmit (TX) antenna sends a signal to a UE with one receive (RX) antenna, the UE should determine the amount of interference to be received simultaneously during the period of receiving corresponding symbols and energy per symbol that the UE may receive on the downlink using the received reference signal and should determine an Es/Io. The determined Es/Io is converted into a data transmission rate or its corresponding value and is provided to the BS in the form of a CQI. Thus, the BS may determine whether to transmit data to the UE at what data transmission speed on the downlink.

In the LTE-A system, the UE feedbacks information on the channel status of downlink to the BS so that it may be utilized for downlink scheduling by the base station. The UE measures the reference signal that the BS sends to the UE and feeds information extracted from the reference signal back to the BS in the form defined in the LTE/LTE-A standards. The following three pieces of information are information that the UE feeds back to the BS in LTE/LTE-A.

RI: the number of spatial layers that may be received by in the current channel status.

PMI: an indicator for a precoding matrix favored by the UE in the current channel status.

CQI: the maximum data rate at which the UE may perform reception in the current channel status. The CQI may be replaced with the SINR, maximum error correction code rate and modulation scheme, or data efficiency per frequency which may be utilized similar to the maximum data rate.

The RI, PMI, and CQI have meanings associated with each other. The precoding matrix supported in the LTE/LTE-A is defined different per rank. Accordingly, the PMI value when the RI is 1 and the PMI value when the RI is 2, even though the values are the same, are interpreted differently. Further, even when the UE determines the CQI, it assumes that the rank value and PMI value that it notified the BS of have been applied by the base station. For example, the case where the UE notified the BS of RI_X, PMI_Y, and CQI_Z means that, when the rank is RI_X, and the precoding is PMI_Y, the UE may receive the data rate corresponding to CQI_Z. In other words, the UE assumes the transmission scheme that is to be performed for the BS when computing the CQI, thereby enabling the securing of the optimized performance upon attending actual transmission in the corresponding transmission scheme.

The periodic feedback by the UE in LTE/LTE-A is set to the following four feedback modes (or reporting modes):

Reporting mode 1-0 (wideband CQI (wCQI) with no PMI)::RI, wCQI

Reporting mode 1-1 (wCQI with single PMI)::RI, wCQI, PMI

Reporting mode 2-0 (subband CQI (sCQI) with no PMI):: RI, wCQI, narrow band sCQI Reporting mode 2-1 (sCQI with single PMI)::RI, wCQI, sCQI, PMI For the four feedback modes, the feedback timing of each piece of information is determined by, e.g., $N_{pd}$, $N_{OFFSET,CQI}$, $M_{RI}$, and $N_{OFFSET,RI}$ transferred via the higher layer signal.

In feedback mode 1-0, the feedback timing is determined as follows: the feedback transmission period of the wCQI is $N_{pd}$, and the offset value is $N_{OFFSET,CQI}$. The feedback transmission period of the RI is $N_{pd} \cdot M_{RI}$, and the offset value is $N_{OFFSET,CQI} + N_{OFFSET,RI}$.

Figure 2:
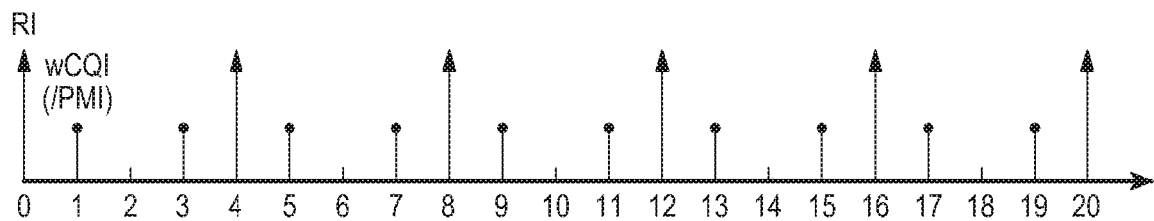
FIG. 2 is a view illustrating feedback timings of an rank indicator (RI) and wideband channel quality indicator (wCQI) when $N_{pd}=2$, $M_{RI}=2$, $N_{OFFSET,CQI}=1$, $N_{OFFSET,RI}=-1$ according to an embodiment of the disclosure.

FIG. 2 is a view illustrating the feedback timings of the RI and wCQI when $N_{pd}=2$, $M_{RI}=2$, $N_{OFFSET,CQI}=1$, $N_{OFFSET,RI}=-1$ according to an embodiment of the disclosure.

Referring to FIG. 2, the feedback timing of each piece of information denotes the subframe index. Feedback mode 1-1, although having the same feedback timing as feedback mode 1-0, differs in that wCQI and PMI are together transmitted at the wCQI transmission timing.

In feedback mode 2-0, the feedback transmission period of the sCQI is $N_{pd}$, and the offset value is $N_{OFFSET,CQI}$. The feedback transmission period for the wCQI is $H \cdot N_{pd}$, and the offset value is, like in the sCQI, $N_{OFFSET,CQI}$. The feedback transmission period of the RI is $M_{RI} \cdot H \cdot N_{pd}$, and the offset value is $N_{OFFSET,CQI} + N_{OFFSET,RI}$. Here, it is defined as $H=J \cdot K+1$, and K is transferred via a higher signal, and J is a value determined as per the system bandwidth. For example, the J value for the 10 MHz system is defined as 3. Resultantly, the wCQI is instead transmitted every H th sCQI transmissions.

Figure 3:
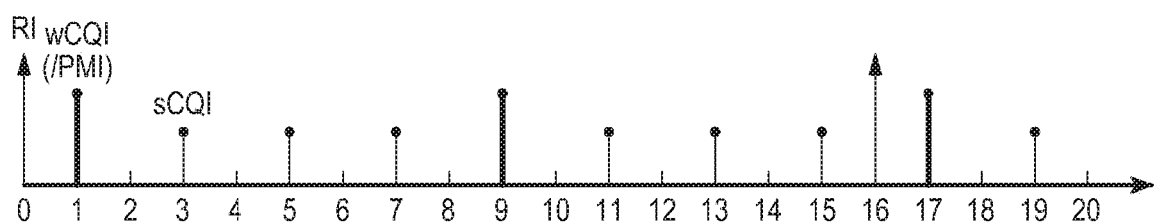
FIG. 3 is a view illustrating feedback timings of an RI, subband CQI (sCQI), and wCQI when $N_{pd}=2$, $M_{RI}=2$, $J=3$ (10 MHz), K=1, $N_{OFFSET,CQI}$=−1, $N_{OFFSET,RI}$=−1 according to an embodiment of the disclosure.

FIG. 3 is a view illustrating feedback timings of an RI, sCQI, and wCQI when $N_{pd}=2$, $M_{RI}=2$, $J=3$ (10 MHz), $K=1$, $N_{OFFSET,CQI}=1$, $N_{OFFSET,RI}=-1$ according to an embodiment of the disclosure.

Referring to FIG. 3, feedback mode 2-1, although having the same feedback timing as feedback mode 2-0, differs in that PMI is together transmitted at the wCQI transmission timing.

The above-described feedback timings are those for the case where the number of CSI-RS antenna ports is 4 or less. For the UE assigned with the CSI-RS for eight antenna ports, two pieces of PMI information should be fed back unlike four antenna ports.

For eight CSI-RS antenna ports, feedback mode 1-1 is divided again into two submodes. In the first submode, the first PMI (PMI1) information is transmitted along with the RI, and the second PMI (PMI2) information is transmitted along with the wCQI. The transmission period and offset of the feedback for the wCQI and the 2 PMI are defined as $N_{pd}$ and $N_{OFFSET,CQI}$, and the feedback transmission period and offset value for the RI and the first PMI information are defined as $M_{RI} \cdot N_{pd}$ and $N_{OFFSET,CQI} + N_{OFFSET,RI}$.

If the precoding matrix corresponding to the first PMI is W1 and the precoding matrix corresponding to the second PMI is W2, the UE and the BS share the information indicating that the precoding matrix favored by the UE has been determined to be W1W2.

In feedback mode 2-1, for eight CSI-RS antenna ports, the feedback of precoding type indicator (PTI) information is added. The PTI is fed back along with the RI, the feedback transmission period for the PTI and the RI is $M_{RI} \cdot H \cdot N_{pd}$, and the offset is defined as $N_{OFFET,CQI} + N_{OFFSET,RI}$.

Where the PTI is 0, the first PMI, the second PMI, and the wCQI are all fed back, and the wCQI and the second PMI are together transmitted in the same timing, and the transmission period is $N_{pd}$, and the offset is given as $N_{OFFSET,CQI}$. The period of the first PMI is $H' \cdot N_{pd}$, and the offset is $N_{OFFSET,CQI}$. Here, H' transferred via a higher signal. Where PTI is 1, PTI together with RI is transmitted, and wCQI and the second PMI are transmitted together, and sCQI is fed back at an additional separate timing. The first PMI is not transmitted. The transmission period and offset of the PTI and RI are the same as those where the PTI is 0, and the transmission period and offset of the sCQI are defined as $N_{pd}$ and $N_{OFFSET,CQI}$, respectively. The wCQI and the second PMI are fed back with the transmission period of $H \cdot N_{pd}$ and the offset of $N_{OFFSET,CQI}$, and H is defined like the case where the number of CSI-RS antenna ports is four.

Figure 4:
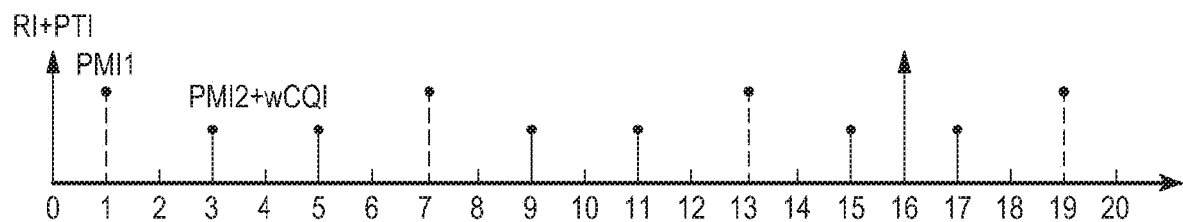
FIG. 4 is a view illustrating feedback timings for the case where PTI=0 when $N_{pd}$=2, $M_{RI}$=2, J=3 (10 MHz), K=1, H'=3, $N_{OFFSET,CQI}$=1, and $N_{OFFSET,RI}$=−1 according to an embodiment of the disclosure.
Figure 5:
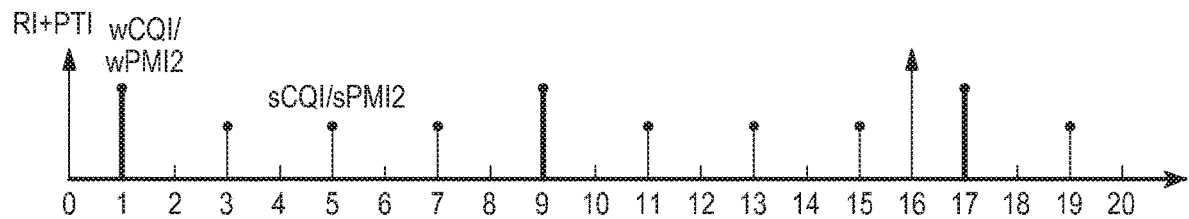
FIG. 5 is a view illustrating feedback timings for the case where PTI=1 when $N_{pd}$=2, $M_{RI}$=2, J=3 (10 MHz), K=1, H'=3, $N_{OFFSET,CQI}$=1, and $N_{OFFSET,RI}$=−1 according to an embodiment of the disclosure.

FIGS. 4 and 5 illustrate feedback timings when PTI=0 and PTI=1 for the cases where $N_{pd}$=2, $M_{RI}$=2, J=3 (10 MHz), K=, H'=3 and $N_{OFFSET,CQI}$=1, $N_{OFFSET,RI}$=−1 according to various embodiments of the disclosure.

Figure 6:
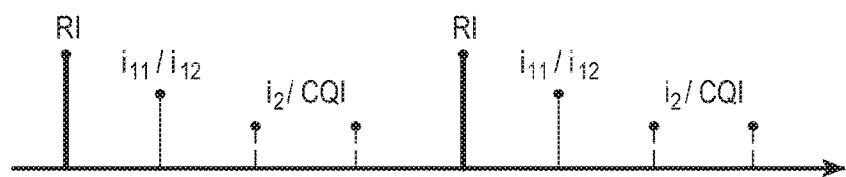
FIG. 6 is a view illustrating an example of periodic channel status information (CSI) report supported by user equipment (UE or UEs) for which a channel status information-reference signal (CSI-RS) of 12 ports or more is set in Rel-13 and Rel-14 according to an embodiment of the disclosure.

FIG. 6 is a view illustrating the structure of the periodic CSI report timing for 12 or more CSI-RS ports for the 2D array antennas supported in Rel-13 and Rel-14 according to an embodiment of the disclosure.

LTE Rel-13 and Rel-14 support the non-precoded (NP) CSI-RS to support 12 or more CSI-RS ports for the 2D array antennas. The NP CSI-RS may support 8, 12, 16, or more CSI-RS ports using the positions for the existing CSI-RSs in one subframe. The corresponding field of the NP CSI-RS is set to CSI-RS-ConfigNZP-EMIMO. The UE may grasp and receive the position for the CSI-RS resources using CSI-RS-ConfigNZP-EMIMO. Further, in the BF CSI-RS, csi-RS-ConfigNZPIdListExt-r13 and csi-IM-ConfigIdListExt-r13 may be used to bundle up individual CSI-RS resources which may differ in the number of CSI-RS ports, subframe, and codebook subset restriction to be used as the BF CSI-RS. To support 2D antennas in the NP CSI-RS, a new 2D codebook is required, and the new 2D codebook may be varied depending on per-dimension antennas and oversampling factors and codebook settings. Analyzing the PMI bits of the 2D codebook, the bits for i2 (W2) reporting may be four bits or less and may use the existing CSI report method. However, in the case of i11/i12, the PMI bits increase as follows for N1, N2, O1, O2, and codebookConfig supported as shown in Table 7.

TABLE 8

PMI overhead analysis of 2D codebook

| (N1, N2) | (O1, O2) combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

Config = 1

| (N1, N2) | (O1, O2) | W11/W12 bits | (O1, O2) | W11/W12 bits |
|---|---|---|---|---|
| (8, 1) | (4, —) | 5 + 2 bits | (8, —) | 6 + 2 bits |
| (2, 2) | (4, 4) | 3 + 1 bits/3 bits | (8, 8) | 4 + 1 bits/4 bits |
| (2, 3) | (8, 4) | 4 + 1 bits/4 bits | (8, 8) | 4 + 1 bits/5 bits |
| (3, 2) | (8, 4) | 5 + 1 bits/3 bits | (4, 4) | 4 + 1 bits/3 bits |
| (2, 4) | (8, 4) | 4 + 1 bits/4 bits | (8, 8) | 4 + 1 bits/5 bits |
| (4, 2) | (8, 4) | 5 + 1 bits/3 bits | (4, 4) | 4 + 1 bits/3 bits |

Config = 2, 3, 4

| (N1, N2) | (O1, O2) | W11/W12 bits | (O1, O2) | W11/W12 bits |
|---|---|---|---|---|
| (8, 1) | (4, —) | 4 + 2 bits | (8, —) | 5 + 2 bits |
| (2, 2) | (4, 4) | 2 + 1 bits/2 bits | (8, 8) | 3 + 1 bits/3 bits |
| (2, 3) | (8, 4) | 3 + 1 bits/3 bits | (8, 8) | 3 + 1 bits/4 bits |
| (3, 2) | (8, 4) | 4 + 1 bits/2 bits | (4, 4) | 3 + 1 bits/2 bits |
| (2, 4) | (8, 4) | 3 + 1 bits/3 bits | (8, 8) | 3 + 1 bits/4 bits |
| (4, 2) | (8, 4) | 4 + 1 bits/2 bits | (4, 4) | 3 + 1 bits/2 bits |

+k: additional bits for rank 3 and 4

Referring to Table 7, it may be identified that when (N1,N2,O1,O2)=(2,4,8,8) and Config is 1, i1 should be transmitted in up to 10 bits. In the case of physical uplink control channel (PUCCH) format 2 used for existing periodic CSI report, the Reed-Muller code used for channel coding may be transmitted in up to 13 bits, but in the case of extended CP, which requires that the 2-bit HARQ ACK/NACK be supported, the size of payload that may indeed be transmitted in the normal CP circumstance is 11 bits. To support the payload size, reporting is performed using three independent CSI reporting times shown in FIG. 6 for both the wideband CQI mode and the subband CQI mode.

LTE/LTE-A supports aperiodic feedback as well as periodic feedback of the UE. When the BS desires to obtain aperiodic feedback information of a particular UE, the BS includes an aperiodic feedback indicator in the DCI for uplink data scheduling of the particular UE. The particular UE, which has received the aperiodic feedback indicator, makes a setting to carry out particular aperiodic feedback, performing uplink data scheduling on the UE. The particular UE, when receiving the indicator set to perform aperiodic feedback in an nth subframe, includes the aperiodic feedback information upon data transmission in an n+kth subframe and performs uplink transmission. k is a parameter defined in the 3GPP LTE release 11 standards, and this is 4 for frequency division duplexing (FDD) and is defined as shown in Table 8 for time division duplexing (TDD).

TABLE 9 k for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the case where the aperiodic feedback is set, the feedback information includes RI, PMI, and CQI like in the case of the periodic feedback, and the RI and the PMI might not be fed back according to feedback settings. The CQI may include both the wCQI and the sCQI or only the wCQI information.

LTE/LTE-A provides codebook sampling functionality for periodic CSI report. In LTE/LTE-A, the periodic feedback of the terminal is transmitted to the BS through the PUCCH. Since the amount of information that may be transmitted once through PUCCH is limited, various feedback objects, such as RI, wCQI, sCQI, wPMI2, and sPMI2, may be transmitted through PUCCH by way of subsampling or two or more pieces of feedback information may be encoded together (joint encoding) and may be transmitted through PUCCH.

As an example, when eight CSI-RS ports are configured by the base station, RI and PMI1 reported in submode 1 of PUCCH mode 1-1 may be joint-encoded as shown in Table 9-1. PMI1 constituted of 4 bits and RI constituted of 10 bits based on Table 9-1 are joint-encoded with five bits in total. Submode 2 of PUCCH mode 1-1 joint encodes PMI1 consisting of four bits and PMI2 consisting of other four bits as shown in Table 9-2 into four bits in total. Since subsampling level is higher as compared with submode 1, (in case of submode 1, 43, in case of submode 2, 84), more precoding indexes cannot be reported.

As another example, in case eight CSI-RS ports are configured by the base station, PMI2 reported in PUCCH mode 2-1 may be subsampled as shown in Table 10. Referring to Table 10, PMI2, when its associated RI is 1, is reported with four bits. However, where the associated RI is two or more, the differential CQI for the second codeword should be reported together, and thus, PMI2 is subsampled with two bits and reported.

TABLE 10-1

Joint encoding of RI and for PUCCH mode 1-1 submode 1

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 10-2

Joint encoding of RI and for PUCCH mode 1-1 submode 2

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 11

PUCCH mode 2-1 codebook subsampling

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
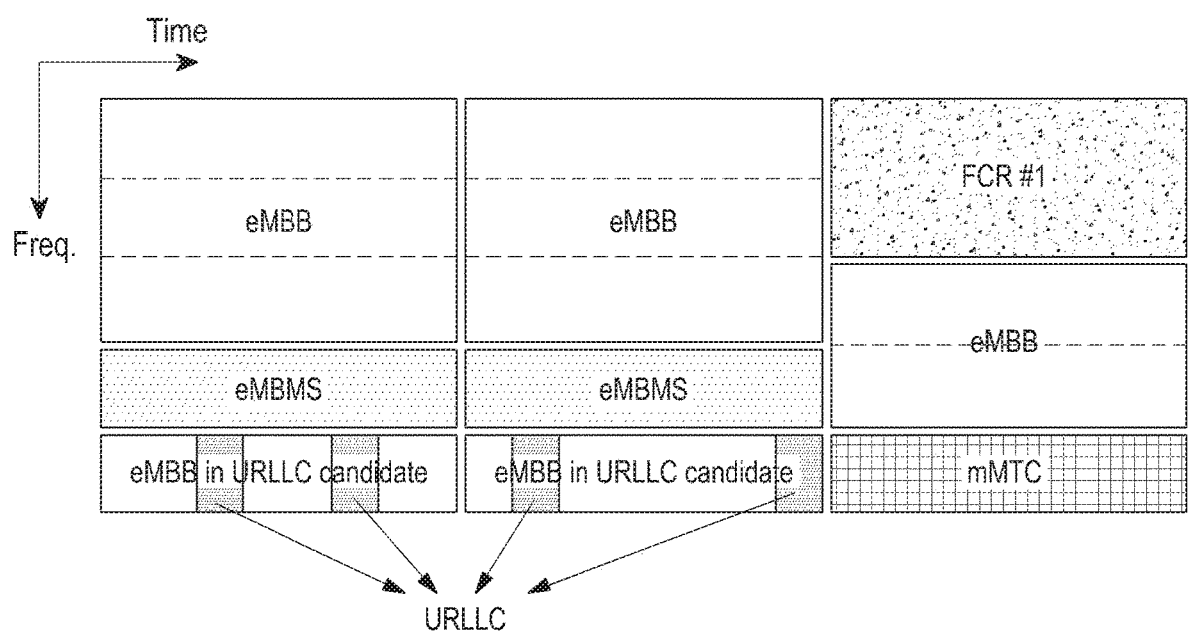
FIG. 7 is a view illustrating an example of a radio resource configuration for data, such as enhanced mobile broadband (eMBB), ultra-reliable low latency communications (URLLC), and massive machine type communication (mMTC) in an new radio (NR) system according to an embodiment of the disclosure.

FIG. 7 is a view illustrating an example in which data, such as eMBB, URLLC, and mMTC, for services considered in the NR system, along with the forward compatible resource (FCR), are assigned to the frequency-time resources according to an embodiment of the disclosure.

Where the URLLC data is generated and transmitted while the eMBB and the mMTC are assigned and transmitted in a particular frequency band, the URLLC data is transmitted, with the portions pre-assigned for the eMBB and mMTC emptied. Among others, short latency is critical for the URLLC. Thus, the URLLC data may be assigned and transmitted in the part of the resources where the eMBB has been assigned, and the eMBB resource may previously be known to the UE. To that end, the eMBB data may not be transmitted in the frequency-time resources that overlap for the eMBB data and URLLC data, and the transmission performance of eMBB data may be lowered. In other words, a failure to transmit eMBB data may occur due to the allocation of the URLLC. The transmission time interval (TTI) used for transmission of the URLLC may be shorter than the TTI used for transmission of the eMBB or mMTC.

To sync with the cell in the network while the UE accesses the wireless communication system, the synchronization signal is used. The synchronization signal means a reference signal that the BS transmits to the UE for time and frequency sync and cell discovery upon the UE's initial access, and in LTE, signals such as a primary synchronization signal (PSS) or a secondary synchronization signal (SSS), may be transmitted for sync.

Figure 8:
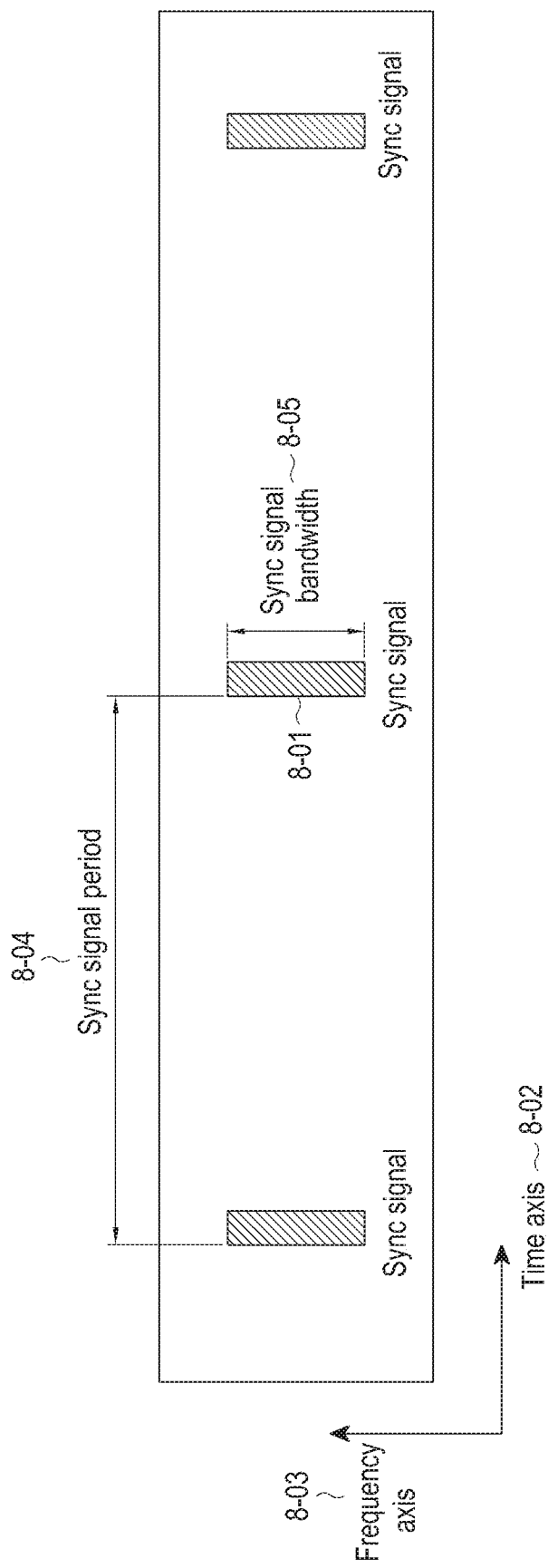
FIG. 8 is a view illustrating an example in which a sync signal is transmitted in a 5th generation (5G) communication system according to an embodiment according to an embodiment of the disclosure.

FIG. 8 is a view illustrating an example in which a sync signal is transmitted in a 5G communication system according to an embodiment of the disclosure.

Referring to FIG. 8, sync signals 8-01 may be transmitted in predetermined periods 8-04 at each cycle on the time axis 8-02. The sync signals 8-01 may be transmitted in a predetermined sync signal transmission bandwidth 8-05 on the frequency axis 8-03. The sync signal may map a particular sequence to the subcarrier in the transmission bandwidth 8-05 to indicate the cell number (Cell ID). The cell number (Cell ID) may be mapped with one sequence or a combination of a plurality of sequences, and the UE may detect the number of the cell that it desires to access by detecting the sequence that has been used for the sync signal.

The sequence used for the sync signal may be a sequence having the constant amplitude zero auto correlation (CA-ZAC) characteristic, such as Zadoff-Chu sequence or Golay sequence, or a pseudo random noise sequence such as M-sequence or gold sequence. Although the above-mentioned sync signals are described herein, embodiments of the disclosure are not limited thereto.

The sync signal 8-01 may be constituted of one or more OFDM symbols. Where the sync signal is constituted of a plurality of OFDM symbols, the sequences for a plurality of different sync signals may be mapped to the OFDM symbols. As an example, similar to LTE, the PSS may be generated using three Zadoff-Chu sequences, and the SSS may be generated using the gold sequence. In one cell, the PSS may have three different values depending on the physical layer cell ID of the cell, and the three cell IDs in one cell ID group correspond to different PSSs. Thus, the UE may identify one of three cell ID groups supported in LTE by detecting the PSS of the cell. The UE may finally be aware of the cell ID of the cell by additionally detecting the SSS among the 168 cell IDs to which the 504 cell IDs have been reduced, via the cell ID group identified via the PSS.

The UE syncs with the cell in the network, obtains the cell number (Cell ID), and finds the cell frame timing. Once this succeeds (i.e., the UE syncs with the cell, thus obtaining the cell number), the UE receives major cell system information. The cell system information is information repetitively broadcast over the network, which the UE needs to receive to access the cell and to properly operate in the cell. In LTE, system information is transmitted through two different transmission channels. A limited amount of system information called master information block (MIB) is transmitted via the physical broadcast channel (PBCH), and the major part of the system information corresponding to the system information block (SIB) is transmitted via the PDSCH. In the LTE system, the system information contained in the MIB includes downlink transmission bandwidth, physical hybrid ARQ indicator channel (PHICH) configuration information, and system frame number (SFN).

Figure 9:
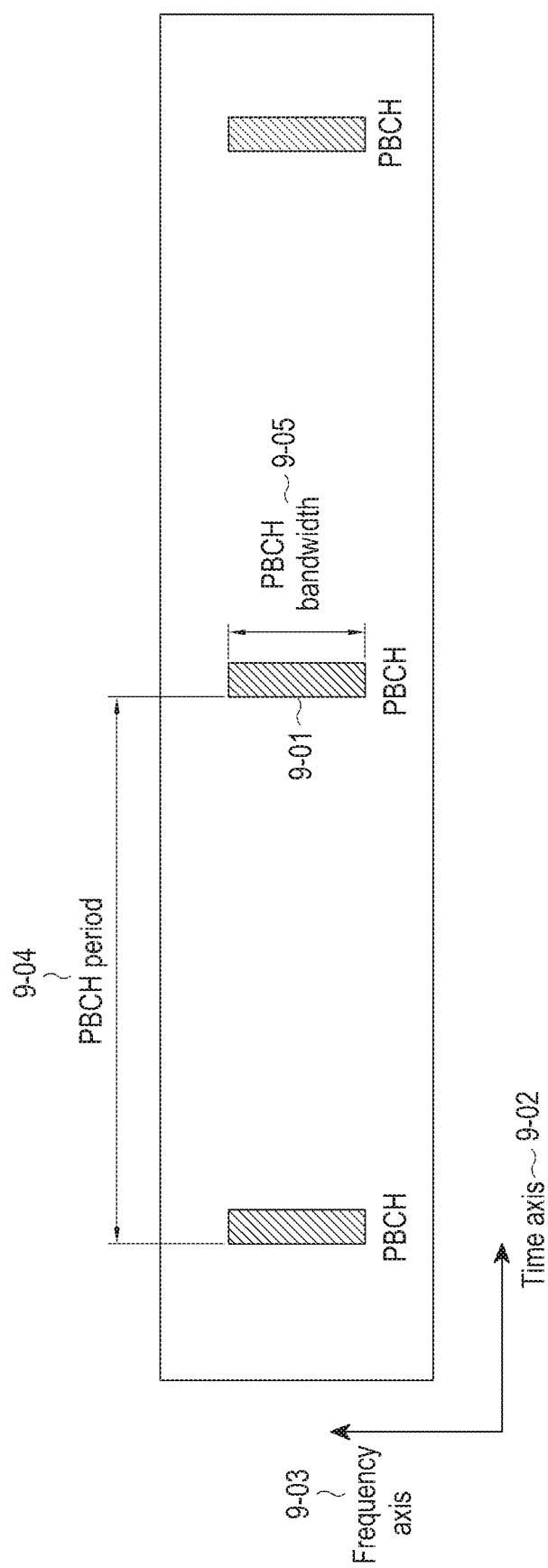
FIG. 9 is a view illustrating an example in which a physical broadcast channel (PBCH) is transmitted in a 5G communication system according to an embodiment according to an embodiment of the disclosure.

FIG. 9 is a view illustrating an example in which a PBCH is transmitted in a 5G communication system according to an embodiment of the disclosure.

Referring to FIG. 9, PBCHs 9-01 may be transmitted in predetermined periods 9-04 at each cycle on the time axis 9-02. The PBCHs 9-01 may be transmitted in a predetermined PBCH transmission bandwidth 9-05 on the frequency axis 9-03. The PBCH may be received by transmitting the same signals in predetermined intervals 9-04 and combining them so as to enhance coverage.

A diversity gain may be obtained without additional information about the transmission scheme used on the receiving (RX) end, by applying a transmission scheme, such as one DMRS port-based precoder cycling, transmit diversity (TxD) using multiple antenna ports. Although the above-mentioned PBCHs are described herein, embodiments of the disclosure are not limited thereto. The PBCH 9-01, like in the current LTE system, may be constituted of a plurality of OFDM symbols in the time-frequency domain resources or may be dispersed in the time-frequency domain resources. To receive the system information, the UE should receive and decode the PBCH, and the LTE system performs channel estimation on the PBCH using the CRS.

Figure 10:
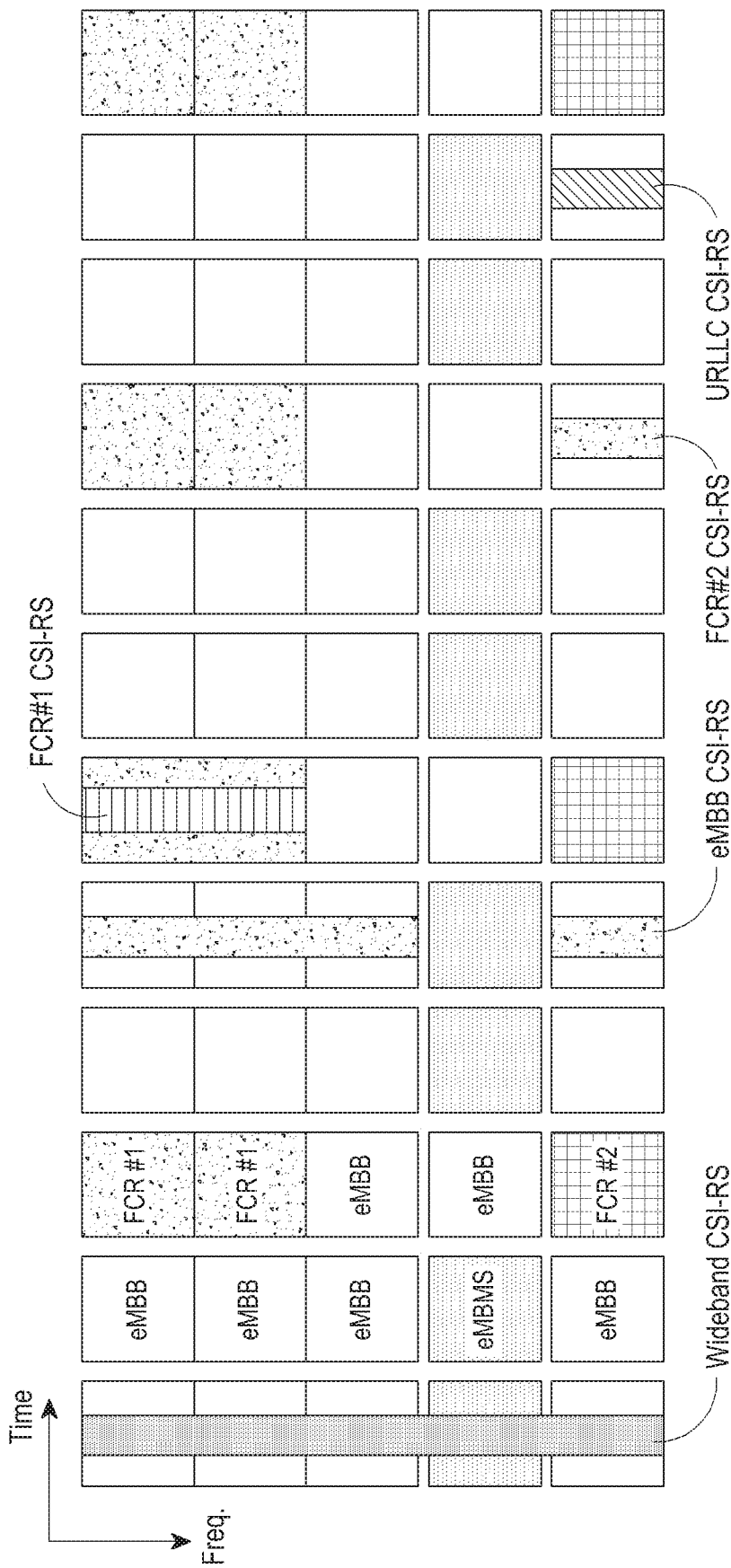
FIG. 10 is a view illustrating an example in which services are multiplexed on time and frequency resources in an NR system according to an embodiment of the disclosure.

FIG. 10 is a view illustrating an example in which, in the NR system, services, such as eMBB and URLLC, are multiplexed in the time and frequency resources according to an embodiment of the disclosure.

The BS may allocate the wideband CSI-RS to the whole band or multiple bands to secure the initial CSI from the UE. Since the CSI-RS in the whole band or multiple bands requires a large amount of reference signal overhead, it may be disadvantageous in optimizing the system performance, but unless there is information previously obtained, it may be inevitable. After the CSI-RS in the whole band and the multiple bands is transmitted, the services may be provided with different requirements per service, and the need for update and the accuracy of CSI necessary may be varied according to the different requirements. Accordingly, the base station, after securing the initial CSI, may trigger the per-service subband CSI-RS in the corresponding band according to the need of each service. Referring to FIG. 10, although in the above example the CSI-RS for one service is transmitted at one time, the CSI-RS for a plurality of services may be transmitted as necessary.

As compared with LTE CSI-RS transmission and CSI report settings, the CSI-RS transmission and CSI report setting supported in NR may differ. NR, unlike LTE, may support more flexible channel status report settings than LTE does, via the resource setting, CSI measurement setting, and CSI report setting to support the CSI report.

Figure 11:
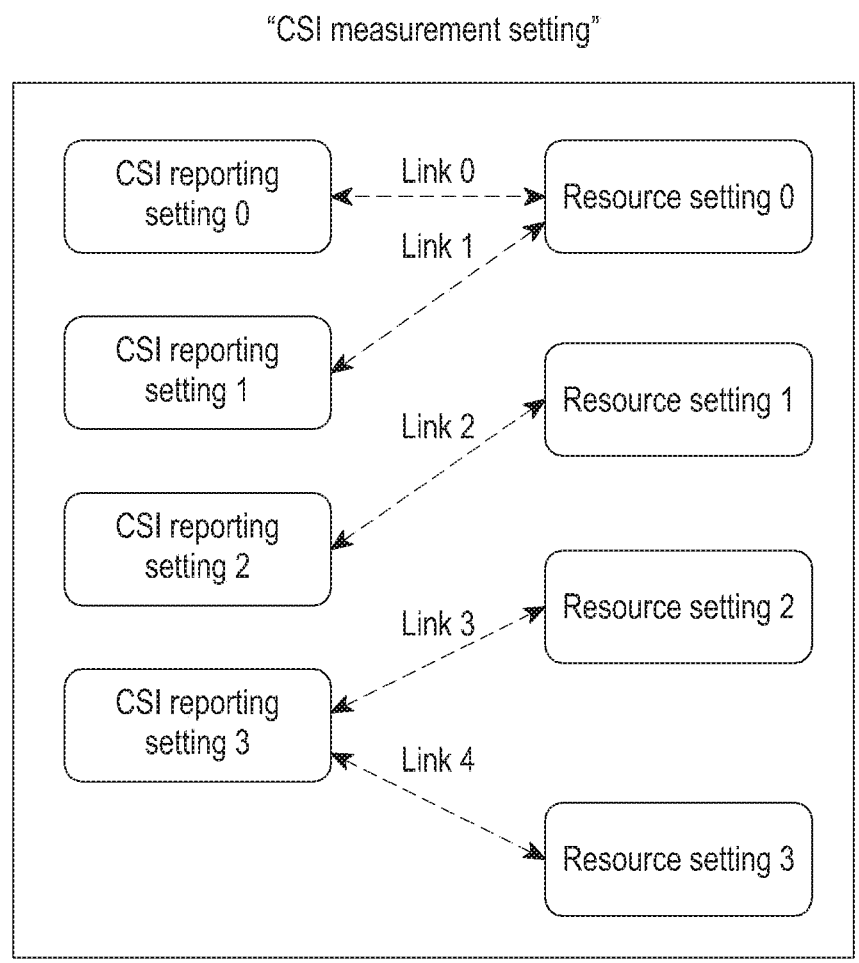
FIG. 11 is a view illustrating an example in which a base station (BS) and a UE permit flexible settings via reference signal settings, CSI report settings, and CSI measurement settings in an NR and CSI report is operated based thereupon according to an embodiment of the disclosure.

FIG. 11 is a view illustrating the resource settings 1110a to 1110d, a CSI measurement setting 1120, CSI report settings 1130a to 1130d, and links link0 to link4. The resource settings, CSI measurement settings, and CSI reporting settings may contain the following configuration information according to an embodiment of the disclosure.

CSI reporting setting: this may set, e.g., the turn-on/off of the report parameter (e.g., RI, PMI, or CQI) necessary for CSI report. It may also be set in the form of, e.g., explicitly reporting the eigenvector or covariance matrix, using the type of the CSI report (e.g., Type I: CSI report with a lower resolution, implicit reporting type, or Type II: CSI report with a higher resolution, linear combination-type CSI report). Specifically, it may support CSI report settings, whether the RI, PMI, CQI, BI, or CRI is reported (individual settings or combined setting), reporting method (periodic, aperiodic, semi-persistent, aperiodic and semi-persistent may be set with one parameter), codebook configuration information, PMI type (whole band/partial band), CSI report type (implicit/explicit or Type I/Type II), channel quality reporting type (CQI/RSRP), and resource settings for CSI report.

Resource setting: this is a setting containing configuration information about the reference signal necessary for channel status measurement. CSI-RS resources for channel measurement and CSI-IM (or interference measurement resource (IMR) resources for interference measurement may be set, and there may be a plurality of resource settings to set the CSI-RS resources for channel measurement and CSI-IM resources for interference measurement. Further, the transmission type (periodic, aperiodic, semi-persistent) of the reference signal, and transmission period and offset of the reference signal may also be set.

CSI measurement setting: this sets mapping or connection between the CSR reporting setting and the resource setting. For example, where there are N CSR reporting settings and M resource settings, the CSI measurement setting may include L links to set the mapping between the plurality of CSI reporting settings and the resource settings. Further, reference signal settings and reporting time association settings (e.g., where the reference signal is transmitted in n subframes or slots, the reporting time may be set using parameters such as D0-0, D1-0, D2-1, D3-2, and D3-3, and the reporting time may thus be defined as n+D0-0) may be made.

NR supports semi-persistent reference signal transmission and CSI in addition to periodic, aperiodic, and CSI report that LTE supports. In the periodic and semi-persistent CSI of the NR, subband reporting among the reporting modes might not be supported. The PUCCH used in periodic and semi-persistent CSI report is limited in the amount of report that may be transmitted. Accordingly, in LTE, the UE selects some subbands of the bandwidth part and transmits on the uplink. However, such selective subband report contains an extremely limited amount of information, the usability of the information is not significant. Accordingly, the complexity of the UE may be reduced and the efficiency of the report may be raised by avoiding support of the report for the selective subband. Further, since no subband report is supported, the UE may abstain from reporting the PMI in the NR periodic CSI reporting or may transmit only one PMI corresponding to the wideband or partial band.

NR aperiodic CSI reporting may support the following reporting modes.

Reporting mode 1-2 (wCQI with multiple PMIs)::RI, wideband CQI (wCQI), multiple wideband and subband PMIs.

Reporting mode 2-0 (sCQI with no PMI)::RI, wCQI, subband CQI (sCQI) of the band that the UE selects.

Reporting mode 2-2 (sCQI with multiple PMIs)::RI, wCQI, sCQI, multiple wideband and subband PMIs.

Reporting mode 3-0 (sCQI with no PMI)::RI, wCQI, sCQI of the whole band.

Reporting mode 3-2 (sCQI with multiple PMIs)::RI, wCQI, sCQI of the whole band, multiple wideband and subband PMIs.

In reporting modes 2-0 and 2-2, one of the subbands of the bandwidth part of the UE is selected and reported, and these might not be supported in NR because the reporting efficiency is low. In the periodic CSI report in LTE, the determination is made using the PMI/RI reporting setting and CQI setting of the CSI report mode setting, and in the case of aperiodic CSI report, the CSI report mode is explicitly set. In NR, the PMI/RI reporting setting CQI reporting setting may be provided for each CSI reporting setting mentioned above.

NR supports two types of CSI report having a lower spatial resolution and a higher spatial resolution.

<Type I CSI Report>

In Type I SP, for 2 ports NR supports the following Type I codebook,

W ∈

$$\left\{(1/\sqrt{2})\begin{bmatrix} 1 \\ e^{j\frac{\pi n}{2}} \end{bmatrix}, n = 0, 1, 2, 3\right\} \text{ for rank-1 and}$$

-continued $$\left\{1/2\begin{bmatrix} 1 & 1 \\ j^n & -j^n \end{bmatrix}, n = 0, 1\right\} \text{ for rank-2.}$$

In Type I SP, for more than 4 ports NR supports the following Type I CSI for rank 1 to 8.

The PMI codebook assumes $W = W_1 W_2$ precoder structure, where $$\begin{bmatrix} B & 0 \\ 0 & B \end{bmatrix},$$

B is composed to L oversampled 2D DFT beams.

For rank 1 and 2, the value of L is configurable: $L \in \{1, 4\}$ $W_2$ performs beam selection (only for L=4) and QPSK co-phasing between two polarizations.

The following 1D/2D antenna port layouts $(N_1, N_2)$ and oversampling factors $(O_1, O_2)$ (cf. Rel 13/14 LTE Class A codebooks) are supported as following table 11-1.

TABLE 11-1

| LTE Class A codebooks | | |
|---|---|---|
| Number of CSI-RS ports | $(N_1, N_2)$ | $(O_1, O_2)$ |
| 4 | (2,1) | (4,—) |
| 8 | (2,2) | (4,4) |
|  | (4,1) | (4,—) |
| 12 | (3,2) | (4,4) |
|  | (6,1) | (4,—) |
| 16 | (4,2) | (4,4) |
|  | (8,1) | (4,—) |
| 24 | (6,2), (4,3) | (4,4) |
|  | (12,1) | (4,—) |
| 32 | (8,2), (4,4) | (4,4) |
|  | (16,1) | (4,—) |

For L=4, the following beam group (B) pattern is supported 2D antenna port layout ($N_2>1$) and 1D antenna port layout ($N_2=1$).

<Type II CSI Report>

In Type II SP, NR supports Type II Cat 1 CSI for rank 1 and 2.

PMI is used for Spatial Channel information feedback.

The PMI codebook assumes the following precoder structure.

For rank 1:

$$W = \begin{bmatrix} \widetilde{W}_{0,0} \\ \widetilde{W}_{1,0} \end{bmatrix} = W_1 W_2, W$$

is normalized to 1.

For rank 2:

$$W = \begin{bmatrix} \widetilde{W}_{0,0} & \widetilde{W}_{0,1} \\ \widetilde{W}_{1,0} & \widetilde{W}_{1,1} \end{bmatrix} = W_1 W_2,$$

Columns of W are normalized to $1/\sqrt{2}$.

$$\widetilde{w_{r,l}} = \sum_{i=0}^{L-1} b_{k_1^{(i)} k_2^{(i)}} \cdot p_{r,l,i}^{(WB)} \cdot p_{r,l,i}^{(SB)} \cdot C_{r,l,i}$$

(weighted combination of L beams).

The value of L is configurable: L∈{2,3,4}.

$b_{k_1,k_2}$ is an oversampled 2D DFT beam.

r=0, 1 (polarization), l=0, 1 (layer).

$p_{r,l,i}^{(WB)}$ wideband (WB) beam amplitude scaling factor for beam i and on polarization r and layer l.

$p_{r,l,i}^{(SB)}$ subband (SB) beam amplitude scaling factor for beam i and on polarization r and layer l.

$C_{r,l,i}$ beam combining coefficient (phase) for beam i and on polarization r and layer l. configurable between QPSK (2 bits) and 8PSK (3 bits).

Configurable amplitude scaling mode: between WB+SB (with unequal bit allocation) VB-only

TABLE 12-3

Report overhead for type I CSI report

| Number of CSI-RS ports | ($N_1$, $N_2$) | ($O_1$, $O_2$) | i1 Payload (L = 1) | i1 Payload (L = 4) | i2 payload | |
|---|---|---|---|---|---|---|
| 4 | (2, 1) | (4, —) | 3 bits | 2 bits | For rank1, | |
| 8 | (2, 2) | (4, 4) | 6 bits | 4 bits | 2 bits for L = 1, | |
|  | (4, 1) | (4, —) | 4 bits | 3 bits | 4 bits for L = 4 | |
| 12 | (3, 2) | (4, 4) | 7 bits | 5 bits | For rank2, | |
|  | (6, 1) | (4, —) | 4 bits | 3 bits | Additional 2 bits | |
| 16 | (4, 2) | (4, 4) | 7 bits | 5 bits | for i1, | |
|  | (8, 1) | (4, —) | 5 bits | 4 bits | 1 bits for L = 1, | |
| 24 | (6, 2), (4, 3) | (4, 4) | 8 bits | 6 bits | 3 bits for L = 4 | |
|  | (12, 1) | (4, —) | 6 bits | 5 bits |  | |
| 32 | (8, 2), (4, 4) | (4, 4) | 8 bits | 6 bits |  | |
|  | (16, 1) | (4, —) | 6 bits | 5 bits |  | |

TABLE 11-3

Report overhead for type II CSI report for (N1,N2) = (4,4), Z = 3,(8-PSK phase), for K leading coefficients

| L(*) | Rotation: [$\log_2(O_1O_2)$] | L-beam Selection (**) | Strongest coefficient (1 out of 2L): [$\log_2 2L$] per layer | WB amp: 3 × (2L-1) per layer | Total WB payload | SB amp (1SB): 1 × (K-1) per layer | SB phase (1 SB): Z × (K-1) + 2 × (2L-K) per layer | Total payload (WB + 10SBs) |
|---|---|---|---|---|---|---|---|---|
| Rank 1 payload (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| Rank 2 payload (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

(*) Note:

K=4, 4, and 6 for L=2, 3, and 4, respectively.

In this example (for illustrative purposes), it is assumed that all $p_{r,l,i}^{(WB)}$>0. The PMI payload is reduced when $p_{r,l,i}^{(WB)}$=0. Details FFS.

(**) Note: It is FFS if beam selection is signaled jointly using [$\log_2(N_1N_2/L)$] bits vs. independently using $\log_2(N_1N_2)$ bits per beam; only one approach will be specified.

This example uses [$\log_2(N_1N_2/L)$] bits to calculate total WB payload and total payload.

Type I CSI report, like in LTE, may report the channel status to the BS via the RI, PMI, CQI, CSI-RS, or resource indicator (CRI), based on the codebook. In contrast, type II reporting may provide a higher resolution via more PMI report overhead in the implicit CSI similar to that of type I reporting, and the PMI report may be created by a linear combination of the precoder, beam, and co-phase used for type I reporting. Further, for explicit CSI report, it may be reported in the form of explicit CSI which is different from the prior form, and an example of which is a method of reporting the covariance matrix of the channel. Also possible is a combination of implicit and explicit reporting. For example, although the covariance matrix of the channel is reported via the PMI, the CQI and RI may be reported together.

Type II requires higher report overhead. Accordingly, type II CSI report may be inappropriate for periodic CSI report that does not have many reportable bits. Conversely, in the case of aperiodic CSI report, type II CSI report is supported via the PUSCH that may support more overhead, type II reporting which needs higher reporting overhead may be supported only in aperiodic CSI report.

In semi-persistent CSI report, type III CSI report may be supported. In NR, since semi-persistent CSI report supports dynamic activation/deactivation as contrasted with periodic CSI report, it requires a relatively higher UE complexity.

In LTE CSI report, the BS sets reference signal and reporting-related settings for the UE via higher layer settings and based on the CSI process. In the case of periodic CSI report, CSI report is performed at a preset reporting time in preset resources. In the case of aperiodic CSI report, configuration information previously set is reported via the trigger that is in the DCI that has been delivered by the BS via the downlink control signal.

Referring to FIG. 11, the CSI measurement settings in NR include the CSI reporting setting, resource setting, and the link connecting between the CSI reporting setting and the resource setting. Methods in which the BS triggers aperiodic CSI report for the UE based on the CSI measurement setting are as follows.

Aperiodic CSI triggering method 1: this triggers based on the link in the CSI measurement setting Aperiodic CSI triggering method 2: this triggers based on the CSI reporting setting in the CSI measurement setting Aperiodic CSI triggering method 1 is a method for triggering based on the link in the CSI measurement setting.

Figure 12:
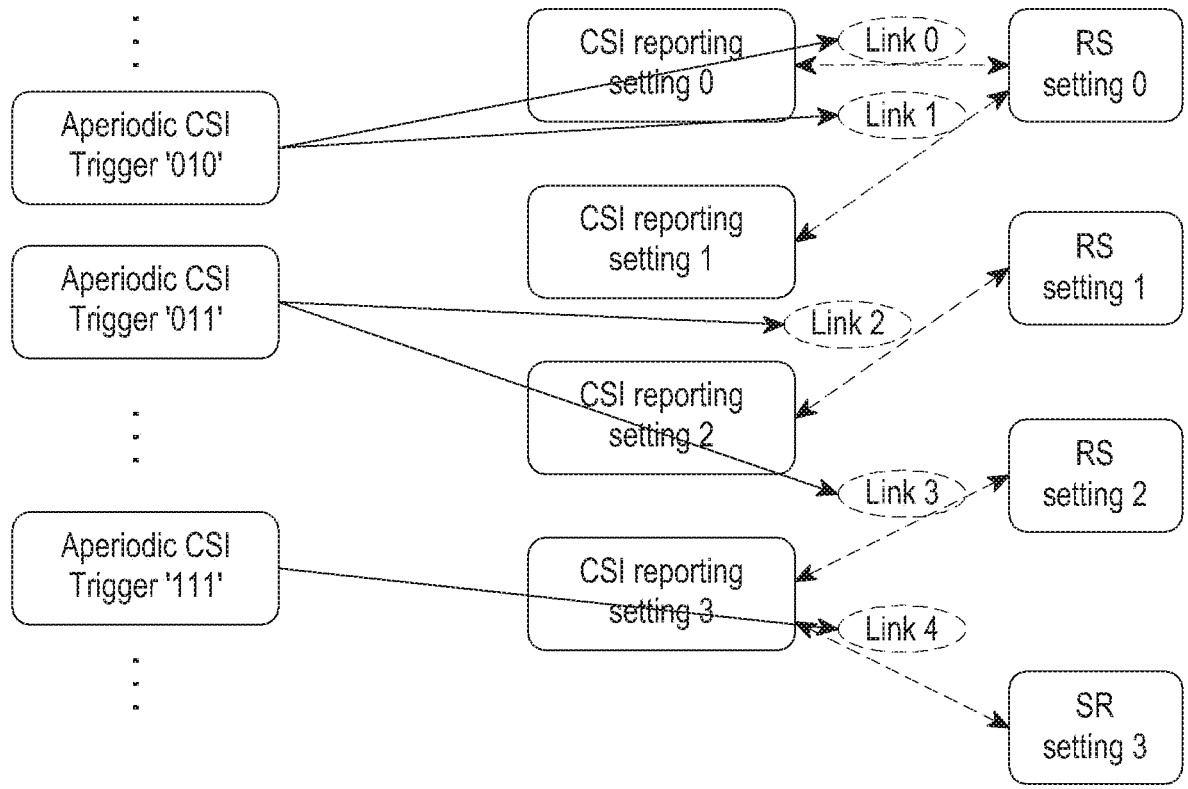
FIG. 12 is a view illustrating an example of a method of triggering a link in a trigger measurement setting as per aperiodic CSI triggering method according to an embodiment of the disclosure 1.

FIG. 12 is a view illustrating an example of a method of triggering a link in a trigger measurement setting as per aperiodic CSI triggering method 1 according to an embodiment of the disclosure.

Referring to FIG. 12, the BS may previously set the link, which is triggered per aperiodic channel status trigger field, to the RRC, for aperiodic CSI report. The BS may directly set the link ID in the trigger setting to set the link that is to be triggered.

As another example, the BS may set using the bitmap of the links of all the cells set for the UE. The indications in the bitmap may be sorted in descending or ascending order based on the cell IDs and link IDs.

Figure 13:
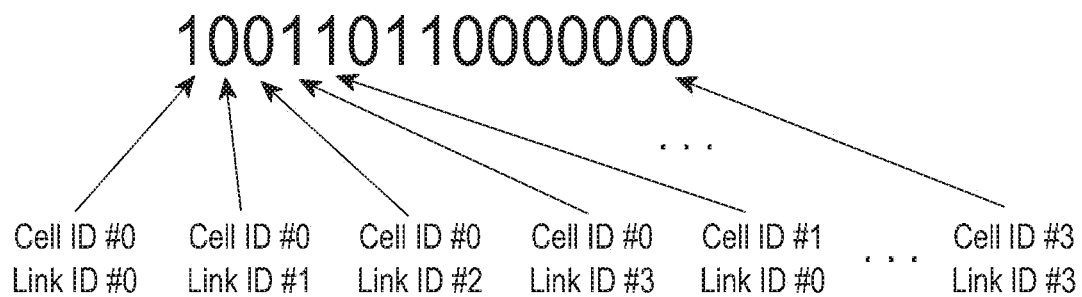
FIG. 13 is a view illustrating an example of an order of indicating a bitmap for aperiodic CSI triggering method 1 according to an embodiment of the disclosure.

FIG. 13 is a view illustrating an example of an order in which the bitmap is indicated according to an embodiment of the disclosure.

Referring to FIG. 13, after the cell IDs are sorted, the indications may be sorted in ascending order from the MSB to the LSB based on the link IDs in the same cell IDs. Although in the example shown in FIG. 13, the cell IDs are first sorted, the link IDs may first be sorted, and the indications may then be sorted in ascending order based on the same link IDs. Although the cell IDs or link IDs are sorted in ascending as shown in FIG. 13, the cell IDs or link IDs may also be sorted in descending order.

Aperiodic CSI triggering method 2 is a method of performing triggering based on the CSI report setting in the CSI measurement setting.

Figure 14:
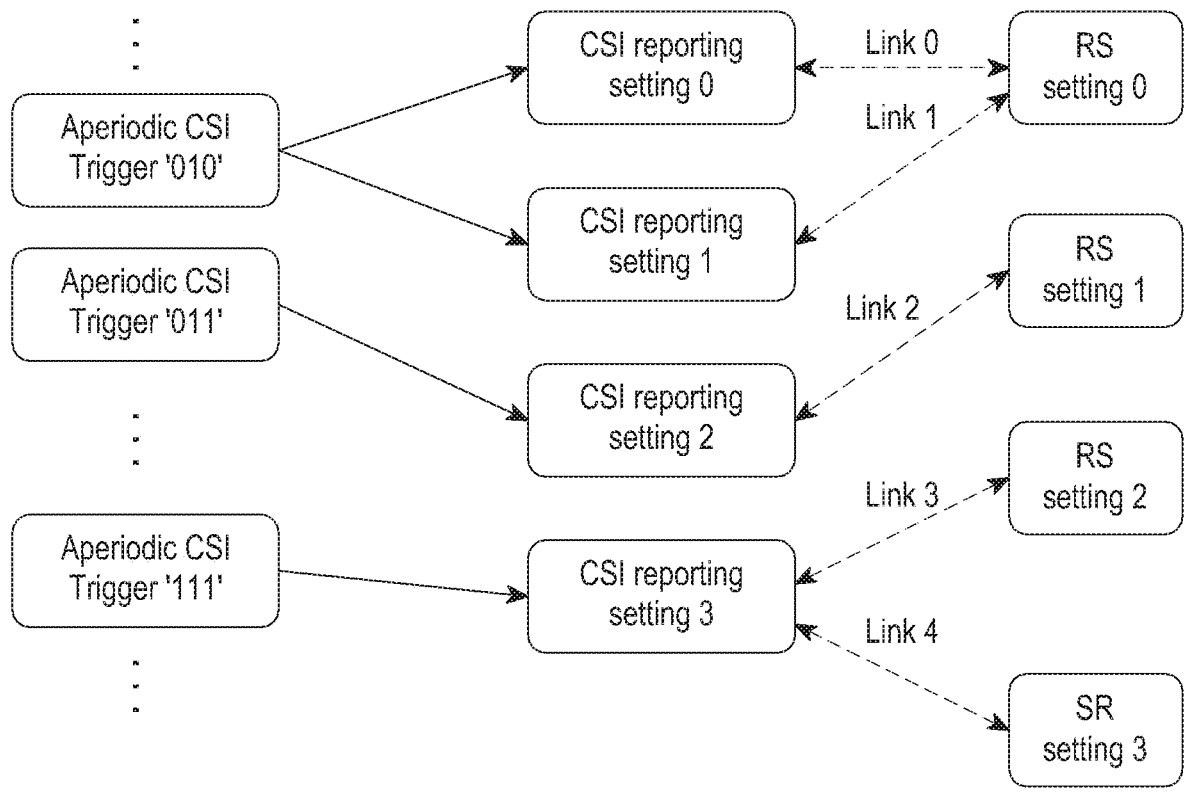
FIG. 14 is a view illustrating an example of a method of triggering a CSI report setting in a trigger measurement setting as per aperiodic CSI triggering method 2 according to an embodiment of the disclosure.

FIG. 14 is a view illustrating an example of a method of triggering a CSI report setting in a trigger measurement setting as per aperiodic CSI triggering method 2 according to an embodiment of the disclosure.

Referring to FIG. 14, the BS may previously set the CSI report setting, which is triggered per aperiodic channel status trigger field, to the RRC, for aperiodic CSI report. The BS may directly set the CSI report setting ID in the trigger setting to set the CSI report setting that is to be triggered.

As another example, the BS may set using the bitmap of the CSI report settings of all the cells set for the UE. The indications in the bitmap may be sorted in descending or ascending order based on the cell IDs and CSI report setting IDs.

Figure 15:
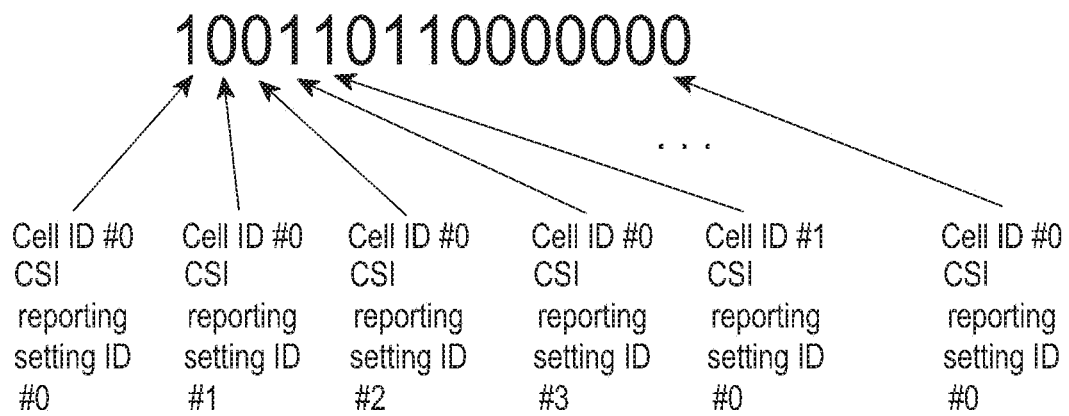
FIG. 15 is a view illustrating an example of an order of indicating a bitmap for aperiodic CSI triggering method 2 according to an embodiment of the disclosure.

FIG. 15 is a view illustrating an example of an order in which the bitmap is indicated according to an embodiment of the disclosure.

Referring to FIG. 15, after the cell IDs are sorted, the indications may be sorted in ascending order from the MSB to the LSB based on the CSI report setting IDs in the same cell IDs. Although in the example shown in FIG. 15, the cell IDs are first sorted, the CSI report setting IDs may first be sorted, and the cell IDs in the same CSI report setting IDs may be sorted in ascending order. Although the cell IDs or CSI report setting IDs are sorted in ascending as shown in FIG. 13, the cell IDs or CSI report setting IDs may also be sorted in descending order.

For the BS to trigger the UE to perform aperiodic CSI report based on the link in the CSI measurement setting, referring to Tables 12-1, 12-2, and 12-3 below, the BS may allow the UE to perform aperiodic CSI report to the BS via the DC by using the trigger field.

TABLE 13-1

Link-based aperiodic CSI report indication field

| Value of CSI request field | Description |
|---|---|
| '000' | No aperiodic CSI report is triggered |
| '001' | Aperiodic CSI report is triggered for a set of link(s) configured by higher layers for serving cell |
| '010' | Aperiodic CSI report is triggered for a $1^{st}$ set of link(s) configured by higher layers |
| ... | ... |

TABLE 13-2

Link-based aperiodic CSI report indication field

| Value of CSI request field | Description |
|---|---|
| '000' | Aperiodic CSI report is triggered for a set of link(s) configured by higher layers for serving cell |
| '001' | Aperiodic CSI report is triggered for a $1^{st}$ set of link(s) configured by higher layers |
| '010' | Aperiodic CSI report is triggered for a $2^{nd}$ set of link(s) configured by higher layers |
| ... | ... |

TABLE 13-3

Link-based aperiodic CSI report indication field

| Value of CSI request field | Description |
|---|---|
| '000' | Aperiodic CSI report is triggered for a $1^{st}$ set of link(s) configured by higher layers |
| '001' | Aperiodic CSI report is triggered for a $2^{nd}$ set of link(s) configured by higher layers |
| '010' | Aperiodic CSI report is triggered for a $3^{rd}$ set of link(s) configured by higher layers |
| ... | ... |

Referring to Table 12-1, for the UE, the BS may abstain from triggering the aperiodic CSI report, or may trigger all the links of the cell used, using the indication field, and the BS may trigger the links, which are triggered for CSI report, by previously setting the RRC from the indication field that is 010, which is the next bit to 001, and its subsequent bits, as described above in connection with triggering method 1.

Referring to Table 12-2, none of the trigger indication fields used do not trigger the UE, all the links of the cell being used may be triggered using a particular indication field, and an option for non-triggering may be present in the previous setting of the trigger field that may be set to, e.g., 001. In other words, any one of the indication fields of 001 or more may enable aperiodic CSI report not to be triggered.

Referring to Table 12-3, the settings for the BS may be rendered flexible by raising the degree of freedom except for the aperiodic CSI report setting that reports all the links in one cell being used. Even in this case, the previous settings of the trigger field that may be set to, e.g., 000, may have the option of non-triggering. In other words, any one of the indication fields of 000 or more may enable aperiodic CSI report not to be triggered.

For the BS to trigger the UE to perform aperiodic CSI report based on the CSI report reporting, referring to Tables 12-4, 12-5, and 12-6 below, the BS may allow the UE to perform aperiodic CSI report to the BS via the DCI by using the trigger field.

TABLE 13-4

CSI report setting-based aperiodic CSI report indication field

| Value of CSI request field | Description |
|---|---|
| '000' | No aperiodic CSI report is triggered |
| '001' | Aperiodic CSI report is triggered for a set of CSI reporting setting(s) configured by higher layers for serving cell |
| '010' | Aperiodic CSI report is triggered for a $1^{st}$ set of CSI reporting setting(s) configured by higher layers |
| ... | ... |

TABLE 13-5

CSI report setting-based aperiodic CSI report indication field

| Value of CSI request field | Description |
|---|---|
| '000' | Aperiodic CSI report is triggered for a set of CSI reporting setting(s) configured by higher layers for serving cell |
| '001' | Aperiodic CSI report is triggered for a $1^{st}$ set of CSI reporting setting(s) configured by higher layers |
| '010' | Aperiodic CSI report is triggered for a $2^{nd}$ set of CSI reporting setting(s) configured by higher layers |
| ... | ... |

TABLE 13-6

CSI report setting-based aperiodic CSI report indication field

| Value of CSI request field | Description |
|---|---|
| '000' | Aperiodic CSI report is triggered for a $1^{st}$ set of CSI reporting setting(s) configured by higher layers |
| '001' | Aperiodic CSI report is triggered for a $2^{nd}$ set of CSI reporting setting(s) configured by higher layers |
| '010' | Aperiodic CSI report is triggered for a $3^{rd}$ set of CSI reporting setting(s) configured by higher layers |
| ... | ... |

Referring to Table 12-4, for the UE, the BS may abstain from triggering the aperiodic CSI report, or may trigger all the CSI report settings of the cell used, using the indication field, and the BS may trigger the CSI report settings, which are triggered for CSI report, by previously setting the RRC from the indication field that is 010, which is the next bit to 001, and its subsequent bits, as described above in connection with triggering method 2.

Referring to Table 12-5, none of the trigger indication fields used do not trigger the UE, all the CSI report settings of the cell being used may be triggered using a particular indication field, and an option for non-triggering may be present in the previous setting of the trigger field that may be set to, e.g., 001. In other words, any one of the indication fields of 001 or more may enable aperiodic CSI report not to be triggered.

Referring to Table 12-6, the settings for the BS may be rendered flexible by raising the degree of freedom except for the aperiodic CSI report setting that reports all the CSI report settings in one cell being used. Even in this case, the previous settings of the trigger field that may be set to, e.g., 000, may have the option of non-triggering. In other words, any one of the indication fields of 000 or more may enable aperiodic CSI report not to be triggered.

The aperiodic CSI-RS for channel measurement and interference measurement may be implicitly indicated using the indication field.

Figure 16:
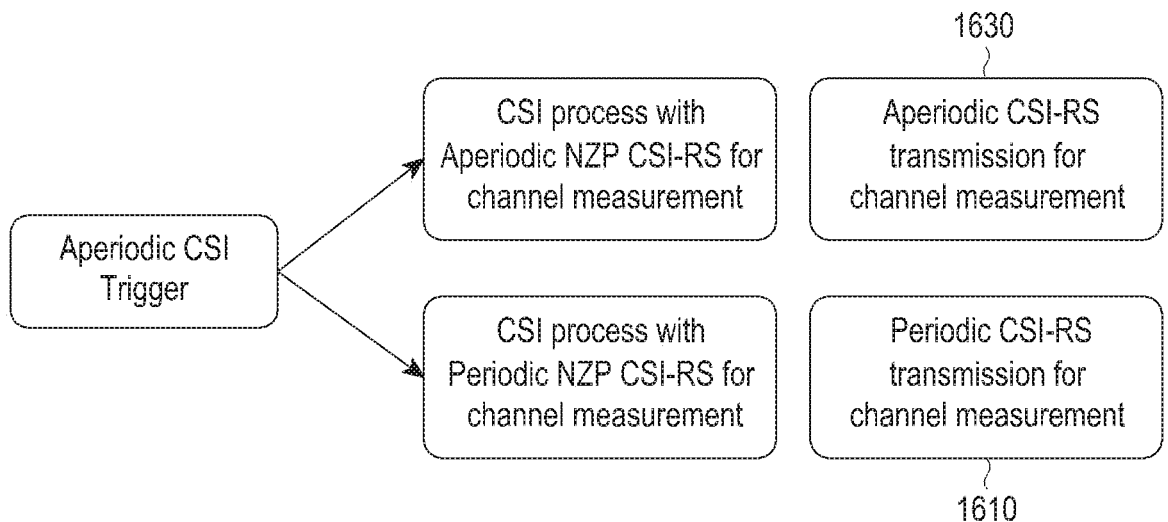
FIG. 16 is a view illustrating an example of indirectly indicating an aperiodic CSI-RS using an aperiodic CSI report indication field according to an embodiment of the disclosure.

FIG. 16 is a view illustrating an example of indirectly indicating an aperiodic CSI-RS using an aperiodic CSI report indication field according to an embodiment of the disclosure.

Referring to FIG. 16, the BS triggers CSI report using the link. Where the resource supported for channel measurement in the resource setting connected to the link is the periodic CSI-RS, aperiodic CSI report may be estimated based on the channel measured in the existing periodic CSI-RS resource (1610). Where the resource supported for channel measurement in the resource setting connected to the link is the aperiodic CSI-RS, aperiodic CSI report may be estimated based on the channel measured in the aperiodically set CSI-RS resource (1630). The aperiodic CSI trigger and aperiodic CSI-RS may always be transmitted in the same slot or the same subframe. Further, the aperiodic CSI report may be triggered not via the link but via the CSI report setting.

Such implicit indication of the aperiodic transmission of measurement resources may apply likewise to the interference measurement resource.

Figure 17:
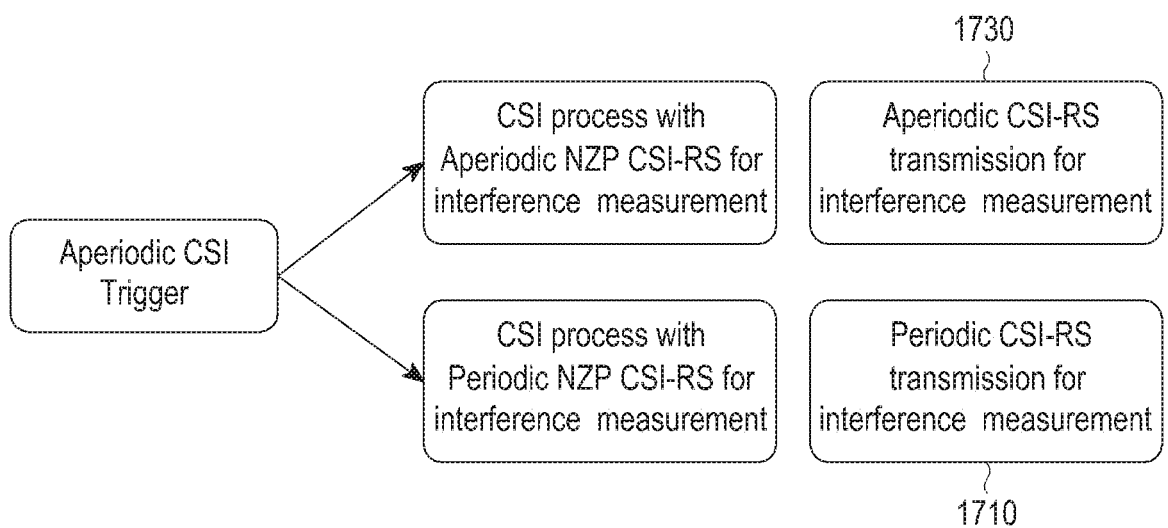
FIG. 17 is a view illustrating an example of indirectly indicating an aperiodic interference measurement resource using an aperiodic CSI report indication field according to an embodiment of the disclosure.

FIG. 17 is a view illustrating an example of indirectly indicating an aperiodic interference measurement resource using an aperiodic CSI report indication field according to an embodiment of the disclosure.

Referring to FIG. 17, the BS triggers CSI report using the link. Where the resource supported for interference measurement in the resource setting connected to the link is the periodic CSI-RS, the aperiodic CSI report estimates interference based on the signal measured in the existing periodic interference measurement resource (1710). Where the resource supported for interference measurement in the resource setting connected to the link is the aperiodic interference measurement resource, aperiodic CSI report may be estimated based on the interference measured in the aperiodically set interference measurement resource (1730). The aperiodic CSI trigger and aperiodic interference measurement resource may always be transmitted in the same slot or the same subframe. Further, the aperiodic CSI report may be triggered not via the link but via the CSI report setting.

NR may support a DCI bit that indicates a reporting time between an aperiodic CSI report indication trigger of a BS and an aperiodic CSI trigger of a UE.

Figure 18:
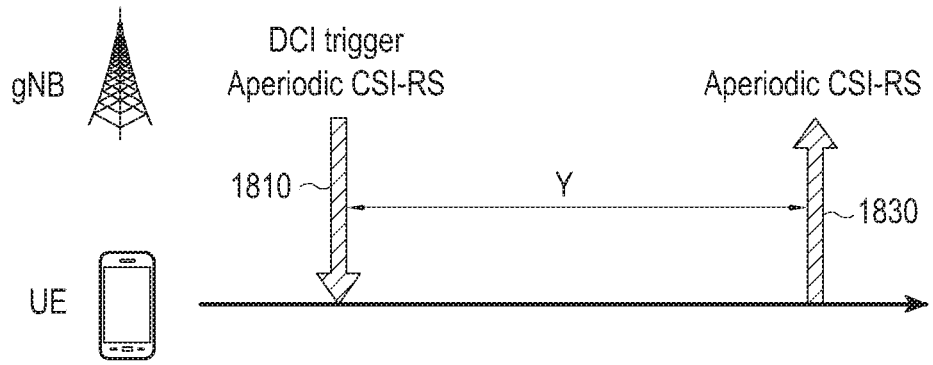
FIG. 18 is a view illustrating an example of indicating a reporting time between an aperiodic CSI report indication trigger of a BS and an aperiodic CSI trigger of a UE according to an embodiment of the disclosure.

FIG. 18 is a view illustrating an example of indicating a reporting time between an aperiodic CSI report indication trigger of a BS and an aperiodic CSI trigger of a UE according to an embodiment of the disclosure.

Referring to FIG. 18, the BS (eNB) transfers a DCI trigger and an aperiodic CSI-RS to the UE in the same slot (1810). The UE may identify whether corresponding aperiodic CSI report is triggered and whether the aperiodic CSI-RS is transmitted, through decoding the downlink control signal and may identify the reporting time difference Y between the aperiodic CSI report and aperiodic CSI-RS 1830 through the reporting time indication. The following methods may be supported for indicating the reporting time difference.

Method 1 for indicating reporting time difference between aperiodic CSI report and aperiodic CSI-RS: this indicates one reporting time difference between aperiodic CSI report and aperiodic CSI-RS Method 2 for indicating reporting time difference between aperiodic CSI report and aperiodic CSI-RS: this indicates the reporting time difference between aperiodic CSI report and aperiodic CSI-RS through indicating multiple time differences Method 1 for indicating the reporting time difference between aperiodic CSI report and aperiodic CSI-RS is a method to indicate the reporting time difference between the time when the UE reports one aperiodic channel status to the BS and the time when the UE receives the aperiodic CSI-RS from the base station. Table 13 represents an example in which the BS indicates, to the UE, the reporting time difference between the aperiodic CSI report and the aperiodic CSI-RS by method 1 for indicating the reporting time difference between aperiodic CSI report and aperiodic CSI-RS.

TABLE 14

Method for indicating reporting time difference between aperiodic CSI report and aperiodic CSI-RS through one DCI field

| | DCI | |
|---|---|---|
| | 0 | 1 |
| Y | 0 | 4 |

Referring to Table 13, the BS indicates, to the UE, the reporting time difference between the CSI report and the aperiodic CSI-RS through one DCI field. Where the DCI field from the BS indicates 0, the UE proceeds with aperiodic CSI report immediately when the DCI is transmitted, and where the DCI field is 1, the UE may proceed with aperiodic CSI report after four slots. Although in Table 13 one option of 0 and 4 is previously determined, Y as per the DCI field may previously be defined in the standards or may be set by the RRC. As an example, the DCI field shown in Table 13 may be set by the RRC, and when the value settable as Y is [0, 1, 2, 4], the BS may previously set the value necessary for each DCI field to 0 and 4. In the method for indicating the reporting time difference between aperiodic CSI report and aperiodic CSI-RS using one DCI field, the DCI may commonly be indicated regardless of differentiating normal uplink data transmission times and aperiodic CSI report based on the DCI for indicating PUSCH transmission times and the DCI for indicating normal uplink data transmissions (PUSCH).

Method 2 for indicating reporting time difference between aperiodic CSI report and aperiodic CSI-RS is a method to indicate the reporting time difference between aperiodic CSI report and aperiodic CSI-RS through indicating multiple time differences Such method for indicating a plurality of time differences is as follows.

- Method 1 for indicating multiple time differences: This is an RRC-based, per-group time difference indicating method
- Method 2 for indicating multiple time differences: this indicates a plurality of time differences as per, e.g., the number of CSI-RS ports and the CSI-RS type.
- Method 3 for indicating multiple time differences: this indicates a plurality of time differences as per the CSI report setting, such as CSI report type (Type I or Type II) or whether the PMI is reported.
- Method 4 for indicating multiple time differences: This varies the indication field per trigger Method 1 for indicating multiple time differences is an RRC-based, per-group time difference indicating method. Table 14 exemplifies an RRC-based, per-group time difference indicating method.

TABLE 15

RRC-based, per-group time difference indicating method

| | Number of CSI-RS ports | | | |
|---|---|---|---|---|
| | Group #1 | | Group #2 | |
| DCI | 0 | 1 | 0 | 1 |
| Y | 0 | 4 | 4 | 6 |

Referring to Table 14, the BS may indicate per-group time differences to the UE.

Method 2 for indicating multiple time differences indicates the plurality of the time differences according to the resource configuration as per, e.g., the number of CSI-RS ports and the CSI-RS type.

The BS may set a different timing indication group considering at least one of aperiodic CSI-RS transmission and the aperiodic CSI reporting-related time difference. Aperiodic CSI-RS transmission may be supported for at least one of each resource setting and CSI report setting. The aperiodic CSI reporting-related time difference refers to the time difference between the aperiodic CSI reporting trigger and the aperiodic CSI reporting. The timing indication group may be set to differ per link or per CSI reporting. Per link or CSI triggered, the UE may report the channel status at the timing appropriate for the corresponding link and CSI report.

Similar to what has been described above in connection with method 1 for indicating the reporting time difference between aperiodic CSI report and aperiodic CSI-RS, settings may be made for candidate time differences per group via the RRC.

Where there are a plurality of time difference groups for one-time aperiodic CSI reporting for the group, it may be indicated via one DCI field. Where it is indicated with one DCI field, the DCI field may be analyzed differently per group, and aperiodic CSI report may be performed, or aperiodic CSI report may be performed according to the largest time difference among the links or CSI report settings triggered by the trigger. Also supportable in addition to indicating through one DCI field is a method for indicating the per-group time difference through a plurality of DCI fields. At this time, the number of the DCI fields may be the same as the number of the groups that the BS or UE may support, and each DCI may indicate the time difference of each group. In this case, like in the method of indicating through one DCI field as described above, aperiodic CSI report may be performed per group at different times based on the time difference indicated per DCI field, or aperiodic CSI report may be performed according to the largest time difference among the links or CSI report settings triggered by the trigger and time difference indication. Although in the above description two groups are assumed to be supported as an example, there may be two or more groups.

Method 2 for indicating multiple time differences is a method to indicate a plurality of time differences as per, e.g., the number of CSI-RS ports, the CSI-RS type, or CSI-RS position. Tables 15-1, 15-2, 15-3, and 15-4 exemplify the method for supporting the indication of a plurality of time differences as per the resource settings.

TABLE 16-1

Indication 1 of multiple time differences as per the number of CSI-RS ports

| | Number of CSI-RS ports | | | |
|---|---|---|---|---|
| | =<8 | | 8> | |
| DCI | 0 | 1 | 0 | 1 |
| Y | 0 | 4 | 4 | 6 |

TABLE 16-2

Indication 2 of multiple time differences as per the number of CSI-RS ports

| | Number of CSI-RS ports | | |
|---|---|---|---|
| | 2 | 4 | >=8 |
| Delta Y | 0 | +2 | +4 |

TABLE 16-3

Indication 1 of multiple time differences as per the CSI-RS position

| | CST-RS location | | | |
|---|---|---|---|---|
| | $4^{th}$~$6^{th}$ OFDM symbol | | $7^{th}$~11th OFDM symbol | |
| DCI | 0 | 1 | 0 | 1 |
| Y | 0 | 4 | 4 | 6 |

TABLE 16-4

Indication 2 of multiple time differences as per the CSI-RS position

| | Number of CSI-RS ports | | |
|---|---|---|---|
| | ~$3^{rd}$ OFDM symbol | $4^{th}$~$6^{th}$ OFDM symbol | $7^{th}$~11th OFDM symbol |
| Delta Y | 0 | +2 | +4 |

TABLE 16-5

Indication 1 of multiple time differences as per the CSI-RS type

| | CSI-RS type | | | |
|---|---|---|---|---|
| | CSI-RS type I | | CSI-RS type II | |
| DCI | 0 | 1 | 0 | 1 |
| Y | 0 | 4 | 4 | 6 |

TABLE 16-6

Indication 2 of multiple time differences as per the CSI-RS type

| | CSI-RS type | |
|---|---|---|
| | CSI-RS type I | CSI-RS type II |
| Delta Y | 0 | +2 |

Referring to Table 15-1, the UE may differently interpret the indication as per the number of CSI-RS ports set in the resource setting in the CSI report setting or link triggered. As another example, referring to Table 15-2, a different delta Y is created depending on the number of antenna ports, and the delta Y is added to the time difference indicated via the delta Y, calculating the reporting time, Y, that should finally be reported. As yet another example, referring to Table 15-3, the UE may differently interpret the indication as per the CSI-RS transmission position set in the resource setting in the CSI report setting or link triggered. As yet another example, referring to Table 15-5, the UE may differently interpret the indication as per the CSI-RS type set in the resource setting in the CSI report setting or link triggered. The delta Y may be applied in the same manner as shown in Tables 15-4 and 15-6.

Similar to what has been described above in connection with method 1 for indicating the reporting time difference between aperiodic CSI report and aperiodic CSI-RS, settings may be made for candidate time differences per group via the RRC. Further, like in the method of indicating through one DCI field as described above, aperiodic CSI report may be performed per group at different times based on the time difference indicated per DCI field, or aperiodic CSI report may be performed according to the largest time difference among the links or CSI report settings triggered by the trigger and time difference indication. Although in the above description two groups are assumed to be supported as an example, there may be two or more groups.

Method 3 for indicating multiple time differences is a method to support the indication of a plurality of time differences as per the CSI report setting, such as CSI report type (Type I or Type II) or whether the PMI is reported. Tables 16-1, 16-2, and 16-3 exemplify the method for supporting the indication of a plurality of time differences as per the CSI report setting.

TABLE 17-1 indication of time difference as per CSI report type

| | CSI reporting type | | | |
|---|---|---|---|---|
| | Type I | | Type II | |
| DCI | 0 | 1 | 0 | 1 |
| Y | 0 | 4 | 4 | 6 |

TABLE 17-2 indication of time difference as per whether PMI is reported

| | PMI reporting | | | |
|---|---|---|---|---|
| | No | | Yes | |
| DCI | 0 | 1 | 0 | 1 |
| Y | 0 | 4 | 4 | 6 |

TABLE 17-3 indication of time difference as per whether CRI is reported

| | CRI reporting | | | |
|---|---|---|---|---|
| | No | | Yes | |
| DCI | 0 | 1 | 0 | 1 |
| Y | 0 | 4 | 4 | 6 |

Referring to Table 16-1, the UE may differently interpret the indication as per the CSI report type set in the CSI report setting or link triggered. Referring to Table 16-2, the UE may differently interpret the indication as per whether the PMI is reported in the CSI report setting or link triggered. Referring to Table 16-3, the UE may differently interpret the indication as per whether the CRI is reported in the CSI report setting or link triggered. Further, as shown in Tables 16-4, 16-5, and 16-6, it may also be possible to differently interpret Y as per the CSI report setting triggered and the information received by the UE through supporting the delta Y type.

TABLE 17-4 indication of time difference as per CSI report type

| | CSI reporting type | |
|---|---|---|
| | Type I | Type II |
| Delta Y | 0 | +2 |

TABLE 17-5 indication of time difference as per whether PMI is reported

| | PMI reporting | |
|---|---|---|
| | No | Yes |
| Delta Y | 0 | +2 |

TABLE 17-6 indication of time difference as per whether CRI is reported

| | CRI reporting | |
|---|---|---|
| | No | Yes |
| Delta Y | 0 | +2 |

Similar to what has been described above in connection with method 1 for indicating the reporting time difference between aperiodic CSI report and aperiodic CSI-RS, settings may be made for candidate time differences per group via the RRC. Further, like in the method of indicating through one DCI field as described above, aperiodic CSI report may be performed per group at different times based on the time difference indicated per DCI field, or aperiodic CSI report may be performed according to the largest time difference among the links or CSI report settings triggered by the trigger and time difference indication. Although in the above description two groups are assumed to be supported as an example, there may be two or more groups.

Where each link or CSI report setting is independently reported at a different reporting time through the time difference indicating method, transmission-related DCI fields, such as resource allocation for the reporting, MCS (TBS), carrier indicator, TPC, DMRS-related indicator, SRI, TRI, TPMI, and redundancy version, may further be required. Such independent transmission may be supported using the following methods.

Transmission-related parameter indicating method 1: the DCI of one group applies to a plurality of independent transmissions in the same manner Transmission-related parameter indicating method 2: the DCI of the independent group applies to each of a plurality of independent transmissions Transmission-related parameter indicating method 3: the DCI of the independent group and the RRC-based parameter are applied to a plurality of independent transmissions in the same manner Transmission-related parameter indicating method 1 is a method to apply the DCI of one group to a plurality of independent transmissions in the same manner. In order to indicate each transmission parameter for independent transmission, much overhead is required. The indication overhead may be reduced and a simplified structure may be supported by applying one transmission parameter group to multiple uplink transmissions.

Transmission-related parameter indicating method 2 is a method to apply the DCI of the independent to each of a plurality of independent transmissions. The overhead required for each link and CSI report setting may differ, so that independent transmission parameters may be required. Accordingly, flexible transmission may be supported by indicating the transmission parameter via the independent DCI group.

Transmission-related parameter indicating method 3 is a method to apply the DCI of the independent group and the RRC-based parameter to a plurality of independent transmissions in the same manner. Where the independent indication is supported via the DCI, the DCI overhead may increase, deteriorating coverage. Accordingly, aperiodic CSI report may be supported while avoiding the DCI overhead from increasing by previously indicating the transmission parameter via the RRC. This is why the aperiodic channel status report transmitted using the RRC may be the channel status report that is first made, and it does not require much overhead. Further, the CSI report which is made after the aperiodic channel status report transmitted using the RRC may make use of RRC-based parameters in which case the BS may support aperiodic CSI report by previously setting a large amount of resources in the RRC.

Method 4 for indicating multiple time differences is a method to support varying the indication field per trigger. Table 17 represents an example of the indication supporting such per-trigger indication field setting.

TABLE 18 per-trigger field indication field setting

| field | Y | field | Y | field | Y |
|---|---|---|---|---|---|
| DCI | 0  1 | DCI | 0  1 | DCI | 0  1 |
| Trigger 010 | 0  2 | Trigger 100 | 0  2 | Trigger 100 | 0  2 |
| Trigger 011 | 2  4 | Trigger 101 | 2  4 | Trigger 101 | 2  4 |

Referring to Table 17, the BS may set, for the UE, each reporting time difference per trigger field, and the UE may differently interpret the indicated DCI bit as per the trigger field indicated by the base station. This gives the advantage of being able to flexibly optimize the content of each trigger field.

Similar to what has been described above in connection with method 1 for indicating the reporting time difference between aperiodic CSI report and aperiodic CSI-RS, settings may be made for candidate time differences per group via the RRC. Further, like in the method of indicating through one DCI field, aperiodic CSI report may be performed per group at different times based on the time difference indicated per DCI field, or aperiodic CSI report may be performed according to the largest time difference among the links or CSI report settings triggered by the trigger and time difference indication. Although in the above description two groups are assumed to be supported as an example, there may be two or more groups.

The above-described reporting time difference indicating methods may be used in combination. For example, the per-resource setting time difference indicating method as per reporting time difference indicating method 2 and the per-CSI report setting time difference indicating method as per indicating method 3 may be used together or in combination. The details of the number of CSI-RS ports or CSI-RS transmission position described above may be varied. For example, a different number of CSI-RS ports may be used.

The above-mentioned particular reporting time difference may be impermissible for a particular CSI report setting, link, or resource setting.

Figure 19:
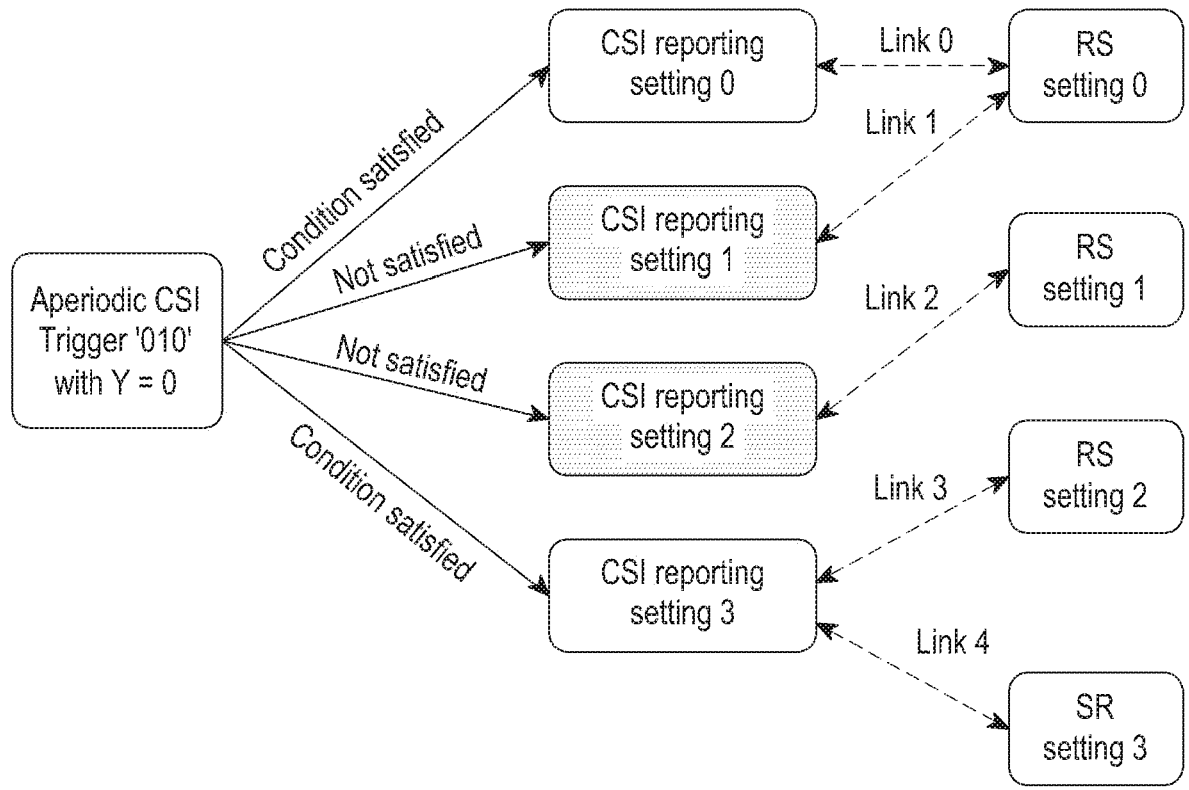
FIG. 19 is a view illustrating an example of an exceptional circumstance where a particular reporting time difference as indicated is impermissible in a particular CSI report setting, link, or resource setting, under the assumption of a CSI report setting trigger according to an embodiment of the disclosure.

FIG. 19 shows an example of such exceptional circumstance under the assumption of the CSI report setting trigger according to an embodiment of the disclosure.

Referring to FIG. 19, the BS may trigger a plurality of links or CSI report settings upon triggering the aperiodic CSI report for the UE. At this time, the particular reporting time indicated may be impermissible for a particular CSI report setting, link, or resource setting. For example, where there are many CSI-RS ports, and PMI feedback is required, the UE needs to measure many channels and calculate many PMIs and CQIs and thus, the UE may not support aperiodic CSI report in the corresponding slot. For such exceptional scenario, there is a need for a method for the UE to process CSI report. The following is a method for the UE to support aperiodic CSI report in such an exceptional case.

Method 1 for aperiodic CSI report for the exceptional case: this transmits the aperiodic channel status report while excluding the link or CSI report for which the exception occurs Method 2 for aperiodic CSI report for the exceptional case: this re-performs the prior CSI report on the link and CSI report setting without update.

Method 3 for aperiodic CSI report for the exceptional case: this fills with agreed-on bits and transmits without reporting the link or channel status report where the exception occurs Method 4 for aperiodic CSI report for the exceptional case: this replaces the CSI report and resource setting requiring more calculation overhead with the CSI report and resource setting not requiring much overhead and transmits it Method 1 for aperiodic CSI report for the exceptional case is a method to transmit the aperiodic channel status report while excluding the link or CSI report for which the exception occurs. When the aperiodic CSI trigger and CSI report time difference are not supported as per the CSI report setting and resource setting, the UE may send out with the link or CSI report information excluded, thereby minimizing the resources necessary for CSI report, lowering the channel coding rate, and raising the transmission probability.

Method 2 for aperiodic CSI report for the exceptional case is a method to re-perform the prior CSI report on the link and CSI report setting without update. Where the channel status is not reported as per the link and CSI report setting where the exception occurs, the resources and coding rate may be minimized, but the amount of information that the UE transmits may be varied according to times. The prior-calculated information may be reported for the CSI report setting and link where the exception occurs, thus minimizing the complexity of implementing the UE while maintaining the amount transmitted.

Method 3 for aperiodic CSI report for the exceptional case is a method to fill with agreed-on bits and transmits without reporting the link or channel status report where the exception occurs. Where the channel status is not reported as per the link and CSI report setting where the exception occurs, the resources and coding rate may be minimized, but the amount of information that the UE transmits may be varied according to times. For the CSI report setting and link where the exception occurs, an agreed-on bit (e.g., 0 or 1) may be put in and transmitted, thereby minimizing the complexity of implementing the UE while maintaining the amount transmitted.

Method 4 for aperiodic CSI report for the exceptional case is a method to replace the CSI report and resource setting requiring more calculation overhead with the CSI report and resource setting not requiring much overhead and to transmit it. A particular resource setting or CSI report setting requires a significant amount of calculation overhead. Thus, where the CSI report setting or link requiring more calculation overhead is triggered, the UE may arbitrarily change it to a lower-overhead setting that it may support and transmit it. For example, the type II CSI report with a higher resolution as described above in connection with CSI report involves very high complexity because the UE is required to combine precoding and further calculate the amplitude and phase necessary for such combination. Thus, where the type II CSI report is triggered along with a short time difference (e.g., 0), the UE may switch type II to type I and report it.

As another example, where many CSI-RS ports (e.g., 16 CSI-RS ports) are triggered, it may also be possible to measure some (e.g., 8) of the 16 CSI-RS port resources and to only support simplified CSI report on the ports. The CSI-RS port resources may be ones that only use the resources in the front portion of the slot.

As another example, where CRI reporting or PMI reporting that reports the precoding or CSI-RS resource favored by the UE is set, this might not be supported. For the CRI, the CSI report may be calculated assuming the first resource, and where PMI reporting is set, PMI reporting may not be supported and the CQI alone may be reported. The PMI information may be fixed in a particular bit or reuse the prior-reported PMI information. Whether it is supported may be varied depending on the PMI type. Where the normal codebook is set, it may be replaced with the beamformed codebook supporting beam selection or the beam selection or port selection codebook. Further, where a short time difference (e.g., 0) is indicated to support aperiodic CSI report, the RI assumed for CSI report may be fixed to a particular rank (e.g., 1) or only a particular rank or smaller one (e.g., 2) may be supported. The RI may be fixed to a particular rank and reported, or the RI may not be reported to reduce the information to be reported. Further, only the single panel codebook structure may be supported. The description of a multi-panel codebook structure supported in NR is represented as follows.

<Type I Multi-Panel Codebook>

In Type I MP, NR supports Type I multi-panel (MP) codebook for rank 1-4.

The rank 1-4 MP codebook can be constructed from SP codebook by the following precoder relation: $w_{p,r,l} = b_{k_1+k'_1,k_2+k'_2,l} \times C_{p,r,l}$ (MP) (normalized by $1/\sqrt{N_g R 2 N_1 N_2}$)

Adding inter-panel co-phasing to SP precoder.

p=0, 1, . . . , Ng−1 (panel, where $N_g$ denotes the number of panels), r=0, 1 (polarization), l=0, 1, . . . , R−1 (layer, where R denotes rank).

$b_{k_1+k'_1,k_2+k'_2,l}$ is taken from single-panel codebook only with L=1.

The following 1D/2D antenna port layouts ($N_g$, $N_1$, $N_2$) and oversampling factors ($O_1$,$O_2$) are supported as Table 18. $N_g$=2 and 4 are supported.

TABLE 18

| Number of CSI-RS ports | ($N_g$,$N_1$,$N_2$) | ($O_1$,$O_2$) |
|---|---|---|
| 8 | (2,2,1) | (4,—) |
|  | (2,2,2) | (4,4) |
| 16 | (2,4,1), (4,2,1) | (4,—) |
| 32 | (2,4,2), (4,2,2) | (4,4) |
|  | (2,8,1), (4,4,1) | (4,—) |

$C_{p,r,l}$ is co-phasing coefficient (for panels and polarizations).

Inter-panel co-phasing payload is configurable:

Mode 1 (WB inter-panel co-phasing): lower payload, supported for $N_g$=2 or 4. Total intra-+inter-panel co-phasing payload=2 bits/subband.

Mode 2 (SB inter-panel co-phasing): higher payload, supported only $N_g$=2. Total intra-+inter-panel co-phasing payload=4 bits/subband. FFS: If $N_g$=4 can be supported with maximum 4 bits/subband.

Such codebook supports inter-panel co-phasing to support a plurality of panels, thus causing the UE to require more calculation complexity and overhead. Thus, where the multi-panel codebook is set, reporting may be made assuming the single panel in the CSI-RS resource or the CSI-RS port corresponding to the first one of the multiple panels or assuming the single panel in all the CSI-RS ports.

The following may be methods for determining the link or CSI report setting triggered as per the reporting time indication indicated in aperiodic CSI report as an exception.

Method 1 for determining link and CSI report setting as exception: this determines the exception as per the resource setting, e.g., the number of CSI-RS ports Method 2 for determining link and CSI report setting as exception: CSI-RS transmission position Method 3 for determining link and CSI report setting as exception: number of CSI-RS resources and CRI settings Method 4 for determining link and CSI report setting as exception: whether PMI is reported Method 1 for determining link and CSI report setting as exception is a method to determine the exception as per the resource setting, e.g., the number of CSI-RS ports. Whether the reporting time may be supported may be determined as per the resource setting contained in the CSI report setting or link triggered for aperiodic CSI report. At this time, the resource setting may be classified as follows.

Classifying method 1 as per CSI-RS ports: classifies as per codebook structures (supports up to two CSI-RS ports)

Classifying method 2 as per CSI-RS ports: classifies as per the number of layouts supported (supports up to four CSI-RS ports)

Classifying method 3 as per CSI-RS ports: supports the maximum number of CSI-RS ports that supports resource selection for beamforming in Rel-13 (supports up to eight CSI-RS ports)

Classifying method 4 as per CSI-RS ports: supports only 1D layout

Classifying method 1 as per CSI-RS ports is a method to support aperiodic CSI report that supports a short time difference or same time up to only two CSI-RS ports depending on the codebook structure. In the case of type I single panel codebook, up to two ports do not follow the setting structure of (N1, N2) and (O1, O2). This means that the codebook structure is simpler and is smaller in the amount of calculation. Therefore, aperiodic CSI report supporting the same time or a shorter time difference may be supported by supporting up to 2 ports.

Classifying method 2 as per CSI-RS ports classifies as per the number of codebooks or the number of layouts supported. The ones up to four CSI-RS ports support one layout and codebook. This means that the codebooks calculable by the UE and hardware units are not many. To support aperiodic CSI report supporting the same time or a shorter time difference, parallelizing the calculation of CSI report information is essential, and as more cases are supported, the complexity of implementing the UE increases. Accordingly, the complexity of implementing the UE may be minimized by supporting only up to four ports that support one layout.

Classifying method 3 as per CSI-RS ports is a method to support the maximum number of CSI-RS ports that supports resource selection for beamforming in Rel-13. In Rel-13, the CSI-RS resource setting of the UE for beam selection may be reported via the CRI. At this time, where one CSI-RS resource is too big, the complexity of implementing the UE may increase. Thus, only up to eight ports may be supported for the CSI-RS resource. Thus, also in NR, up to eight CSI-RS ports may be supported when the aperiodic CSI report time is indicated, thereby reducing the complexity of implementing the UE.

Classifying method 4 as per CSI-RS ports classifies as per the type of the layout supported. Since LTE Rel-13, the codebook supports 2D layouts, whereby as (N1, N2) supports a value other than 1, it can be identified that antennas are present in both the two dimensions. The 2D layout requires more calculation. Thus, the complexity of implementing the UE may be minimized by supporting only 1D layout so that the UE supports the aperiodic CSI report supporting the same time or a shorter time difference.

In applying the classifying methods as per the CSI-RS ports, two or more classifying methods may simultaneously be applied. For example, classifying methods 3 and 4 may simultaneously be applied so that only the 1D layout in not more than eight ports may be used to support the aperiodic CSI report supporting the same time or a shorter time difference.

Method 2 for determining link and CSI report setting as exception is a method to determine the exception per CSI-RS transmission position. For CSI-RS transmission positions, they may be distinguished per symbol (e.g., transmitted within the first seven OFDM symbols) or per slot as shown in Table 15-4.

Method 3 for determining link and CSI report setting as exception is a method to determine the exception as per the number of CSI-RS resources and CRI settings. In this method, where CRI reporting and a plurality of CSI-RS resources are set in the link and CSI report setting may be treated as an exception, or where the number of CSI-RS resources exceeds a particular number (e.g., four) may be treated as an exception. CRI reporting may subject the UE to more calculation and increased reporting complexity. Thus, such restrictions may be posed to minimize the complexity.

Method 4 for determining link and CSI report setting as exception is a method to determine the exception as per whether the PMI is reported. In this method, where PMI reporting is set in the link and CSI report setting is treated as an exception. PMI reporting may subject the UE to more calculation and increased reporting complexity. Thus, such restrictions may be posed to minimize the complexity.

The CSI report setting exception determining methods, like the resource setting exception determining methods, may be used in combination. For example, determining methods 3 and 4 may simultaneously be used, methods 2, 3, and 4 all may be used together, or methods 2 and 3 or methods 2 and 4 may be used.

In addition to treating the exception, where the UE fails to report all the links or CSI report settings due to limitations to its capability or PUSCH resources even after determining the exception using the exception determining methods, the UE may abstain from transmitting the link or CSI report setting by another scheme. For example, the link ID, CSI report setting ID, or cell ID may be used, and the following combinations may be possible.

Additional exception treating method 1: cell ID>link ID or CSI report setting ID.
Additional exception treating method 2: cell ID<link ID or CSI report setting ID.

Where the link or CSI report setting is treated as an exception by the above-mentioned exception treating methods, the UE may apply the exception treatment to other determination standards. As an example, in LTE, the UE may apply it to the standard for determining whether only CSI report is supported. Table 19 below represents rules regarding aperiodic CSI trigger field and reporting supported in LTE.

As set forth in Table 19 above, upon aperiodic CSI report, the number of aperiodic CSI trigger fields supported and the number of CSI report cells or CSI processes reportable may be varied depending on the bit assigned to the aperiodic CSI report. At this time, the link or CSI report setting treated as an exception may not be included upon identifying whether the aperiodic CSI report is possible.

In the above example, in the case of aperiodic CSI-RS-based channel or interference measurement-based aperiodic CSI report, CRI reporting may not be supported in the resource setting or CSI report setting, or a plurality of CSI-RS resources may not be set. This is why the aperiodic CSI-RS indication and aperiodic CSI report indication are simultaneously supported in one slot, and accordingly, the time for measuring and calculating a large amount of aperiodic CSI-RS resources as required for the UE to perform CRI reporting may be insufficient. Or, in the case of aperiodic CSI-RSs, the number of CSI-RS resources supported in the CSI-RS or the number of CSI-RS repetitions for receive beam sweeping may be limited.

The above-described aperiodic CSI-RS CRI reporting, the plurality of CSI-RS resources, and resource set setting may differently be supported depending on the channel measurement CSI-RS or beam measurement CSI-RS. For example, such limitation may be imposed only when the CSI-RS is not for beam measurement and reporting (e.g., RSRP) but for CSI report. This is why beam measurement and reporting may be supported only with a small number of CSI-RS ports (e.g., one or two CSI-RS ports), unlike CSI report measurement. Accordingly, the channel measurement CSI-RS does not support CRI reporting and a plurality of CSI-RS resource settings. The aperiodic CSI-RS for beam measurement and reporting may support a plurality of CSI-RS resource settings, but the number of CSI-RS resources supported in the CSI-RS or the number of CSI-RS repetitions for receive beam sweeping may be limited.

All of the embodiments described herein may be supported or used in combination, and the specific number of

TABLE 20 per-allocated resource aperiodic CSI report field overhead and aperiodic CSI report For a non-BL/CE UE and for $29 \leq I_{MCS} \leq 31$ the modulation order ( $Q_m$ ) is determined as follows:
- if DCI format 0/0A/0B is used and $I_{MCS} = 29$ or, if DCI format 4 is used and only 1 TB is enabled and $I_{MCS} = 29$ for the enabled TB and the signalled number of transmission layers is 1 or if DCI format 4A/4B is used and $I_{MCS} = 29$ for both TBs and N =1 (determined by the procedure in subclause 8.0), and if
    - the "CSI request" bit field is 1 bit and the bit is set to trigger an aperiodic report and, $N_{PRB} \leq 4$ or,
    - the "CSI request" bit field is 2 bits and is triggering an aperiodic CSI report for one serving cell according to Table 7.2.1-1A, and, $N_{PRB} \leq 4$ or,
    - the "CSI request" bit field is 2 bits and is triggering an aperiodic CSI report for more than one serving cell according to Table 7.2.1-1A and, $N_{PRB} \leq 20$ or,
    - the "CSI request" bit field is 2 bits and is triggering an aperiodic CSI report for one CSI process according to Table 7.2.1-1B and $N_{PRB} \leq 4$ or,
    - the "CSI request" bit field is 2 bits and is triggering an aperiodic CSI report for more than one CSI process according to Table 7.2.1-1B and $N_{PRB} \leq 20$ or,
    - the "CSI request" bit field is 2 bits and is triggering an aperiodic CSI report for one CSI process or {CSI process, CSI subframe set}-pair according to Table 7.2.1-1C and $N_{PRB} \leq 4$ or,
    - the "CSI request" bit field is 2 bits and is triggering an aperiodic CSI report for more than one CSI process and/or {CSI process, CSI subframe set}-pair according to Table 7.2.1-1C and $N_{PRB} \leq 20$ or,
    - the "CSI request" bit field is 3 bits and is triggering an aperiodic CSI report for one CSI process according to Table 7.2.1-1D or Table 7.2.1-1E and $N_{PRB} \leq 4$ or,
    - the "CSI request" bit field is 3 bits and is triggering an aperiodic CSI report for 2 to 5 CSI processes according to Table 7.2.1-1D or Table 7.2.1-1E and $N_{PRB} \leq 20$ , or
    - the "CSI request" bit field is 3 bits and is triggering an aperiodic CSI report for more than 5 CSI processes according to Table 7.2.1-1D or Table 7.2.1-1E, or
    - the "CSI request" bit field in DCI format 0A/0B/4A/4B is set to trigger an aperiodic CSI report, CSI-RS antenna ports and CSI-RS resources, the number of indication groups, or other specifically mentioned numbers are provided simply as examples, and the numbers may be varied.

Figure 20:
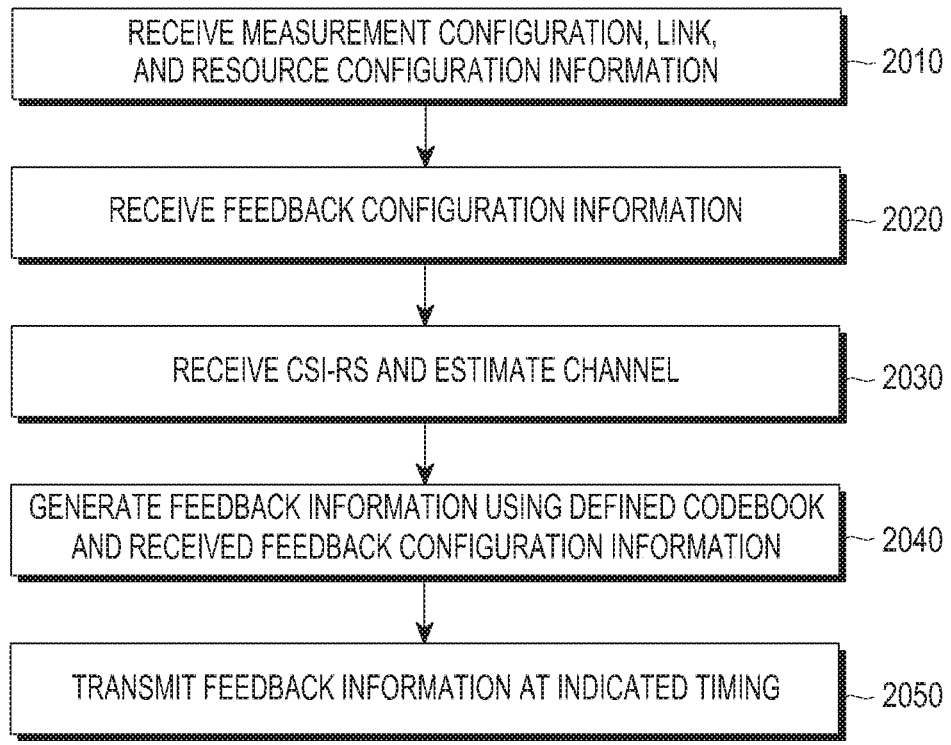
FIG. 20 is a flowchart illustrating operations by a UE according to an embodiment according to an embodiment of the disclosure.

FIG. 20 is a flowchart illustrating the order of operations of a UE according to an embodiment of the disclosure.

Referring to FIG. 20, in operation 2010, the UE receives CSI measurement setting and resource setting information. The configuration information may contain information about a reference signal for measuring the channel status. For example, the information about the reference signal may identify at least one of the type of the reference signal, the number of the ports of the reference signal, the type of the codebook, N1 and N2, each of which indicates the number of antennas per dimension, O1 and O2, each of which indicates the oversampling factor per dimension, one subframe config for transmitting multiple CSI-RSs, a plurality of resource config's for setting the position, codebook subset restriction-related information, CSI reporting-related information, CSI-process index, the candidate number to indicate the timing between the aperiodic CSI trigger and the aperiodic CSI report, and transmit power information (PC).

Thereafter, in operation 2020, the UE configures one piece of feedback configuration information via the CSI report setting used in the CSI measurement setting.

The feedback configuration information may be set to at least one of whether the PMI/CQI is reported, the period and offset, the RI period and offset, the CRI period and offset, whether it is wideband or subband, the submode, the type of CSI report, and the candidate number to indicate the timing between the aperiodic CSI trigger and the aperiodic CSI report.

Upon receiving the reference signal based on the feedback configuration information in operation 2030, the UE estimates the channel between the antenna of the BS and the receive antenna of the UE based on the reference signal in operation 2040.

In operation 2040, the UE may generate the feedback information rank, PMI, and CQI using the received feedback configuration and based on the estimated channel and may select the optimal CRI based thereupon.

Thereafter, in operation 2050, the UE transmits the feedback configuration information to the BS at the feedback timing determined as per the timing indication between the aperiodic CSI trigger and the aperiodic CSI report, and the aperiodic CSI trigger or the feedback configuration of the base station, thereby finishing the channel feedback generation and reporting.

Figure 21:
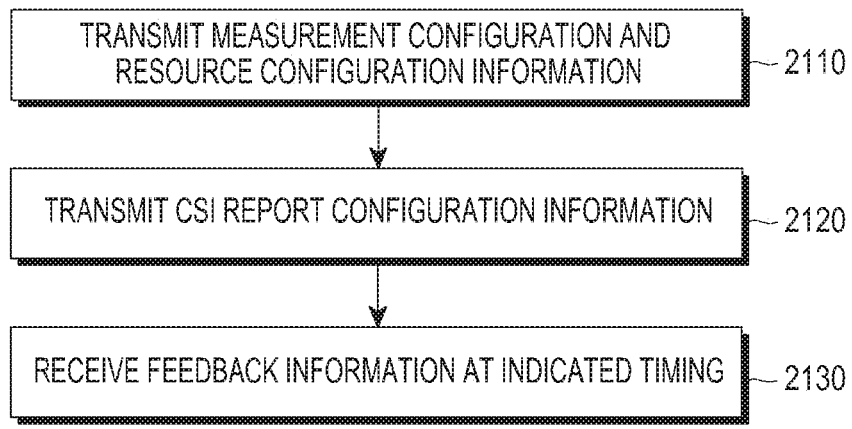
FIG. 21 is a flowchart illustrating operations by a BS according to an embodiment according to an embodiment of the disclosure.

FIG. 21 is a flowchart illustrating the order of operations of a BS according to an embodiment of the disclosure.

Referring to FIG. 21, in operation 2110, the BS transmits configuration information about the CSI report configuration and the reference signal for measuring the channel to the UE.

The configuration information may be set as at least one of the type of each reference signal, the time or frequency resource position, service type, supported feedback type, and measurement subset, and to transmit the reference signal based thereupon, it may include at least one of the number of the ports for the reference signal, N1 and N2, each of which indicates the number of antennas per dimension, O1 and O2, each of which indicates the oversampling factor per dimension, one subframe config for transmitting multiple reference signals, a plurality of resource config's for setting the position, codebook subset restriction-related information, CSI reporting-related information, CSI-process index, and transmit power information (PC).

Thereafter, in operation 2120, the BS transmits, to the UE, feedback configuration information that is based on at least one or more CSI-RSs. The feedback configuration information may be set to at least one of the PMI/CQI period and offset, the RI period and offset, the CRI period and offset, whether it is wideband or subband, the submode, and the candidate number to indicate the timing between the aperiodic CSI trigger and the aperiodic CSI report.

Thereafter, the BS transmits the configured CSI-RS to the UE. The UE estimates the channel per antenna port and estimates an additional channel for a virtual resource based on the same. The UE determines feedback, generates CRI, PMI, RI, and CQI corresponding to the same, and transmits the same to the base station. Accordingly, the BS receives the feedback information from the UE at a predetermined timing and uses the same to determine the channel status between the UE and the BS in operation 2130.

Figure 22:
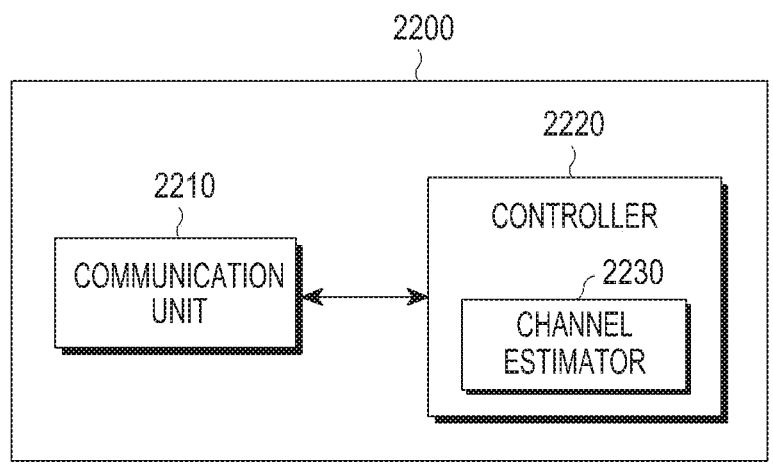
FIG. 22 is a block diagram illustrating an inner structure of a UE according to an embodiment according to an embodiment of the disclosure.

FIG. 22 is a block diagram illustrating an inner structure of a UE according to an embodiment of the disclosure.

Referring to FIG. 22, the UE includes a communication unit 2210 and a controller 2220. The communication unit 2210 performs the function of transmitting or receiving data from the outside (e.g., a base station). Here, the communication unit 2210 may transmit feedback information to the BS under the control of the controller 2220. The controller 2220 controls the state and operation of all the components of the UE. Specifically, the controller 2220 generates feedback information according to the information allocated by the base station. Further, the controller 2220 controls the communication unit 2210 to feedback the generated channel information to the BS according to the timing information allocated by the base station. To that end, the controller 2220 may include a channel estimator 2230.

The channel estimator 2230 determines the position of the resource in the time and frequency resources based on the service and feedback information received from the BS and identifies necessary feedback information based on the related CSI-RS and feedback allocation information. The channel is estimated using the CSI-RS received based on the feedback information.

Although such an example is described in FIG. 22 that the UE 2200 includes the communication unit 2210 and the controller 2220, the UE 2200 may further include various components depending on functions performed thereon without limited thereto. For example, the UE may further include a displaying unit displaying the current state of the UE, an input unit receiving signals such as performing functions from the user, and a storage unit storing data generated in the UE. Further, although the channel estimator 2230 is shown to be included in the controller 2220, it is not necessarily limited thereto.

The controller 2220 may control the communication unit 2210 to receive configuration information for each of at least one or more reference signal resources from the base station. Further, the controller 2220 may control the communication unit 2210 to measure the at least one or more reference signals and receive from the BS feedback configuration information to generate feedback information as per the measurement result.

Further, the controller 2220 may measure at least one or more reference signals received via the communication unit 2210 and generate feedback information according to the feedback configuration information. The controller 2220 may control the communication unit 2210 to transmit the generated feedback information to the BS at a feedback timing as per the feedback configuration information. Further, the controller 2220 may receive a CSI-RS from the base station, generate feedback information based on the received CSI-RS, and transmit the generated feedback information to the base station. In this case, the controller 2220 may select each precoding matrix per antenna port group of the BS and further select an additional precoding matrix based on the relationship between the antenna port groups of the base station.

Further, the controller 2220 may receive a CSI-RS from the base station, generate feedback information based on the received CSI-RS, and transmit the generated feedback information to the base station. In this case, the controller 2220 may select one precoding matrix for all the antenna port groups of the base station. Further, the controller 2220 may receive feedback configuration information from the base station, receive a CSI-RS from the base station, generate feedback information based on the received feedback configuration information and CSI-RS, and transmit the generated feedback information to the base station. In this case, the controller 2220 may receive additional feedback configuration information based on the relationship between the antenna port groups and the feedback configuration information corresponding to each antenna port group of the base station.

Figure 23:
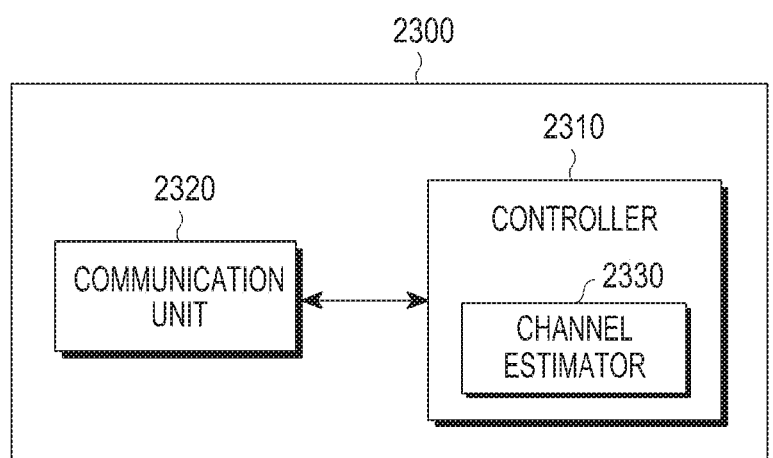
FIG. 23 is a block diagram illustrating an inner structure of a BS according to an embodiment of the disclosure.

FIG. 23 is a block diagram illustrating an inner structure of a BS according to an embodiment of the disclosure.

Referring to FIG. 23, the BS 2300 includes a controller 2310 and a communication unit 2320. The controller 2310 controls the state and operation of all the components of the base station. Specifically, the controller 2310 allocates, to the UE, relevant settings for the UE to obtain resource information and CSI-RS resources for channel estimation and allocates feedback resources and feedback timing to the UE. For this, the controller 2310 may further include a resource allocator 2330. Further, the controller 2510 allocates feedback configuration and feedback timing not to prevent feedback from the UE and receives and interprets the feedback information configured at the corresponding timing. The communication unit 2320 performs the function of communication data, reference signals, and feedback information with the UE. Here, the communication unit 2320 transmits CSI-RSs to the UE through the allocated resources and receives a feedback for the channel information from the UE under the control of the controller 2310. The communication unit 2320 transmits the reference signal based on, e.g., the CRI, rank, partial PMI information, and CQI information obtained from the CSI transmitted from the UE.

Further, although the resource allocator 2330 is shown to be included in the controller 2310, it is not necessarily limited thereto. The controller 2310 may control the communication unit 2320 to transmit the configuration information for each of at least one or more reference signals to the UE or generate at least one or more reference signals. Further, the controller 2310 may control the communication unit 2320 to transmit to the UE feedback configuration information to generate feedback information as per the measurement result. Further, the controller 2310 may control the communication unit 2320 to transmit the at least one or more reference signals to the UE and receive the feedback information transmitted from the UE at a feedback timing according to the feedback configuration information. Further, the controller 2310 may transmit the feedback configuration information to the UE, transmit the CSI-RS to the UE, and receive from the UE feedback information generated based on the feedback configuration information and the CSI-RS. In this case, the controller 2310 may transmit additional feedback configuration information based on the relationship between the antenna port groups and the feedback configuration information corresponding to each antenna port group of the base station. Further, the controller 2310 may transmit to the UE the beamformed CSI-RS based on the feedback information and receive from the UE the feedback information generated based on the CSI-RS. According to the above-described embodiments of the disclosure, it may be possible to prevent allocation of excessive feedback resources in transmitting CSI-RSs from the BS having a number of two-dimensional antenna array structure transmit antennas and the increase in channel estimation complexity of the UE. The UE may effectively measure the channel of all of the many transmit antennas, configure the same in feedback information, and notify the same to the base station.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for a user equipment (UE) configured to operate in a wireless communication system, the method comprising:
   receiving configuration information about a resource of a channel status information-reference signal (CSI-RS) from a base station (BS);
   receiving, from the base station, feedback configuration information including channel status information (CSI) report configuration about a first CSI associated with the CSI-RS;
   receiving downlink control information (DCI) in a slot in which the CSI-RS is received, wherein the DCI comprises a first field related to a time difference between a reception of the CSI-RS and a transmission of the first CSI and a second field indicating an aperiodic CSI trigger;
   identifying whether the UE is available for transmitting the first CSI on a transmission timing determined based on a reception timing of the DCI and the time difference based on the configuration information;
   in case that the UE is available for transmitting the first CSI on the transmission timing, transmitting, to the BS, the first CSI generated based on the CSI-RS and the CSI report configuration on the transmission timing; and
   in case that the UE is not available for transmitting the first CSI on the transmission timing, decreasing a number of CSI-RS ports included in the configuration information and changing a type of a panel codebook included in the CSI report configuration from a multi panel codebook to single panel codebook, and transmitting, to the BS, a second CSI being generated based on the decreased number of CSI-RS ports and the single panel codebook on the transmission timing,
   wherein the time difference is determined based on the first field and one of (i) a number of CSI-RS ports, (ii) information on whether a CSI-RS resource indicator (CRI) is reported in the CSI and (iii) information on whether a precoding matrix indicator (PMI) is reported in the CSI.

2. The method of claim 1, wherein the feedback configuration information includes at least one of whether a precoding matrix indicator (PMI)/channel quality indicator (CQI) is reported, a period and offset of the PMI/CQI, a period and offset of a rank indicator (RI), a period and offset of a channel status information-reference signal (CSI-RS) resource indicator (CRI), whether a wideband or a subband, a submode, a type of CSI report, or a candidate number to indicate a timing between the aperiodic CSI trigger and an aperiodic CSI report.

3. A method for a base station (BS) configured to operate in a wireless communication system, the method comprising:
  transmitting configuration information about a resource of a channel status information-reference signal (CSI-RS) to a UE;
  transmitting, to the UE, feedback configuration information including channel status information (CSI) report configuration about a first CSI associated with the CSI-RS;
  transmitting, to the UE, downlink control information (DCI) in a slot in which the CSI-RS is received, wherein the DCI comprises a first field related to a time difference between a transmission of the CSI-RS and a transmission of the first CSI and a second field indicating an aperiodic CSI trigger;
  in case that the UE is available for transmitting the first CSI on a transmission timing which is determined based on a reception timing of the DCI and the time difference, receiving the first CSI, which is generated based on the CSI-RS and the CSI report configuration; and
  in case that the UE is not available for transmitting the first CSI on a transmission timing, receiving, on the transmission timing, a second CSI being generated based on a number of CSI-RS ports and a type of a panel codebook,
  wherein the time difference is determined based on the first field and one of (i) a number of CSI-RS ports, (ii) information on whether a CSI-RS resource indicator (CRI) is reported in the CSI and (iii) information on whether a precoding matrix indicator (PMI) is reported in the CSI, and
  wherein the number of CSI-RS ports is decreased by the UE compared to a number of CSI-RS ports included in the configuration information, and the type of the panel codebook is a single panel codebook which is changed by the UE from a multi panel codebook.

4. The method of claim 3, wherein the feedback configuration information includes at least one of whether a precoding matrix indicator (PMI)/channel quality indicator (CQI) is reported, a period and offset of the PMI/CQI, a period and offset of a rank indicator (RI), a period and offset of a channel status information-reference signal (CSI-RS) resource indicator (CRI), whether a wideband or a subband, a submode, a type of CSI report, or a candidate number to indicate a timing between the aperiodic CSI trigger and an aperiodic CSI report.

5. A user equipment (UE) configured to operate in a wireless communication system, the UE comprising:
  a communication circuit configured to transmit or receive signals with a transmitting UE or a base station (BS); and
  at least one processor configured to control the communication circuit, wherein the at least one processor is configured to:
  receive configuration information about a resource of a channel status information-reference signal (CSI-RS) from a base station,
  receive, from the BS, feedback configuration information including channel status information (CSI) report configuration about a first CSI associated with the CSI-RS,
  receive downlink control information (DCI) in a slot in which the CSI-RS is received, wherein the DCI comprises a first field related to a time difference between a reception of the CSI-RS and a transmission of the first CSI and a second field indicating an aperiodic CSI trigger,
  identify whether the UE is available for transmitting the first CSI on a transmission timing determined based on a reception timing of the DCI and the time difference based on the configuration information,
  in case that the UE is available for transmitting the first CSI on the transmission timing, transmit, to the BS, the first CSI generated based on the CSI-RS and the CSI report configuration on the transmission timing, and
  in case that the UE is not available for transmitting the first CSI on the transmission timing, decrease a number of CSI-RS ports included in the configuration information and change a type of a panel codebook included in the CSI report configuration from a multi panel codebook to single panel codebook and, transmit, to the BS, a second CSI being generated based on the decreased number of CSI-RS ports and the single panel codebook on the transmission timing,
  wherein the time difference is determined based on the first field and one of (i) a number of CSI-RS ports, (ii) information on whether a CSI-RS resource indicator (CRI) is reported in the CSI and (iii) information on whether a precoding matrix indicator (PMI) is reported in the CSI.

6. The UE of claim 5, wherein the feedback configuration information includes at least one of whether a precoding matrix indicator (PMI)/channel quality indicator (CQI) is reported, a period and offset of the PMI/CQI, a period and offset of a rank indicator (RI), a period and offset of a channel status information-reference signal (CSI-RS) resource indicator (CRI), whether a wideband or a subband, a submode, a type of CSI report, or a candidate number to indicate a timing between the aperiodic CSI trigger and an aperiodic CSI report.

7. A base station (BS) configured to operate in a wireless communication system, the BS comprising:
  a communication circuit configured to transmit or receive signals with another BS or a UE; and
  at least one processor configured to control the communication circuit, wherein the at least one processor is configured to:
  transmit configuration information about a resource of a channel status information-reference signal (CSI-RS) to the UE,
  transmit, to the UE, feedback configuration information including channel status information (CSI) report configuration about a first CSI associated with the CSI-RS,
  transmit, to the UE, downlink control information (DCI) in a slot in which the CSI-RS is received, wherein the DCI comprises a first field related to a time difference between a transmission of the CSI-RS and a transmission of the first CSI and a second field indicating an aperiodic CSI trigger, and
  in case that the UE is available for transmitting the first CSI on a transmission timing which is determined based on a reception timing of the DCI and the time difference, receive the first CSI, which is generated based on the CSI-RS and the CSI report configuration, and
  in case that the UE is not available for transmitting the first CSI on a transmission timing, receive, on the transmission timing, a second CSI being generated based on a number of CSI-RS port and a type of a panel codebook, wherein the time difference is determined based on the first field and one of (i) a number of CSI-RS ports, (ii) information on whether a CSI-RS resource indicator (CRI) is reported in the CSI and (iii) information on whether a precoding matrix indicator (PMI) is reported in the CSI, wherein the number of CSI-RS ports is decreased by the UE compared to a number of CSI-RS ports included in the configuration information, and the type of the panel codebook is a single panel codebook which is changed by the UE from a multi panel codebook.

8. The BS of claim 7, wherein the feedback configuration information includes at least one of whether a precoding matrix indicator (PMI)/channel quality indicator (CQI) is reported, a period and offset of the PMI/CQI, a period and offset of a rank indicator (RI), a period and offset of a channel status information-reference signal (CSI-RS) resource indicator (CRI), whether a wideband or a subband, a submode, a type of CSI report, or a candidate number to indicate a timing between the aperiodic CSI trigger and an aperiodic CSI report.

* * * * *